(12) United States Patent
Adams

(10) Patent No.: US 8,783,968 B2
(45) Date of Patent: Jul. 22, 2014

(54) FIBRE OPTIC CONNECTOR ASSEMBLY AND ACCESS TOOL KIT

(75) Inventor: Darren Adams, Haverhill (GB)

(73) Assignee: Advanced Fiber Products, Limited, Haverhill, Suffolk (GB)

( * ) Notice: Subject to any disclaimer, the term of this patent is extended or adjusted under 35 U.S.C. 154(b) by 135 days.

(21) Appl. No.: 13/218,902

(22) Filed: Aug. 26, 2011

(65) Prior Publication Data

US 2011/0311186 A1 Dec. 22, 2011

Related U.S. Application Data

(63) Continuation of application No. PCT/GB2010/000356, filed on Feb. 26, 2010.

(30) Foreign Application Priority Data

| Feb. 26, 2009 | (GB) | 0903326.7 |
| Sep. 8, 2009 | (GB) | 0915728.0 |
| Oct. 1, 2009 | (GB) | 0917235.4 |

(51) Int. Cl.
*G02B 6/36* (2006.01)
*H01R 13/627* (2006.01)
*G02B 6/00* (2006.01)

(52) U.S. Cl.
USPC ............ 385/77; 385/78; 385/134; 439/344; 439/352

(58) Field of Classification Search
USPC .............. 385/53, 58, 76, 78, 134–139, 55, 385/59–60, 77; 439/133, 304, 344, 540.1, 439/676, 680, 352
See application file for complete search history.

(56) References Cited

U.S. PATENT DOCUMENTS

| 4,311,883 A | 1/1982 | Kidney |
| 4,376,565 A | 3/1983 | Bird |

(Continued)

FOREIGN PATENT DOCUMENTS

| CN | 1829926 A | 9/2006 |
| DE | 102004019757 | 1/2005 |

(Continued)

OTHER PUBLICATIONS

UK search report for application No. GB 0917235.4 dated Mar. 10, 2010.

(Continued)

*Primary Examiner* — Uyen Chau N Le
*Assistant Examiner* — Michael Mooney
(74) *Attorney, Agent, or Firm* — Chicago IP Law; Steven M. Evans

(57) ABSTRACT

A fiber optic connector is provided comprising: a connector plug, which may be inserted into an associated socket in a longitudinal direction; a resilient leg, depending at a first end thereof from the first connector plug, and having a depressible part, distal therefrom, depressible towards the first connector plug; and a guard cover, configured to prevent access to the depressible part of the resilient leg in its direction of depression, but to permit access to the resilient leg in the longitudinal direction through an access aperture, the access aperture being aligned with the depressible part of the resilient leg on an axis parallel with the longitudinal direction, to allow depression of the resilient leg through the access aperture directly. A corresponding extraction tool and methods, loopback connector, blanking plug, blanking plate and patch panel are also provided.

15 Claims, 20 Drawing Sheets

(56) References Cited

U.S. PATENT DOCUMENTS

| | | |
|---|---|---|
| 4,615,575 A | 10/1986 | Kossor |
| 4,647,726 A | 3/1987 | Blum |
| 4,740,168 A | 4/1988 | Carney |
| 4,781,626 A | 11/1988 | Lazarchik |
| 4,846,708 A | 7/1989 | Marson |
| 4,911,646 A | 3/1990 | Marson |
| 5,334,044 A | 8/1994 | Falossi |
| 5,340,324 A | 8/1994 | Fields |
| 5,370,556 A | 12/1994 | Olsson |
| 5,429,522 A | 7/1995 | Noschese |
| 5,538,438 A | 7/1996 | Orlando |
| 5,556,295 A | 9/1996 | McFadden |
| 5,591,038 A | 1/1997 | Guzay |
| 5,637,002 A | 6/1997 | Buck |
| 5,675,682 A | 10/1997 | De Marchi |
| 6,080,001 A | 6/2000 | Wong |
| 6,250,817 B1 | 6/2001 | Lampert |
| 6,821,159 B2 | 11/2004 | Munger |
| 6,918,782 B2 | 7/2005 | Foster |
| 6,960,025 B2 | 11/2005 | Gurreri |
| 7,043,315 B2 | 5/2006 | Litao |
| 7,118,286 B2 | 10/2006 | Gurreri |
| 7,207,724 B2 | 4/2007 | Gurreri |
| 7,318,754 B1 | 1/2008 | Vaden |
| 7,325,976 B2 | 2/2008 | Gurreri |
| 7,354,291 B2 | 4/2008 | Caveney |
| 7,438,584 B2 | 10/2008 | Caveney |
| 7,530,824 B2 | 5/2009 | Bolain |
| 7,578,690 B2 | 8/2009 | Caveney |
| 7,632,125 B2 | 12/2009 | Irwin |
| 8,308,498 B2 * | 11/2012 | Adams .................. 439/304 |
| 2002/0126960 A1 | 9/2002 | Gurreri |
| 2003/0063862 A1 | 4/2003 | Fillion et al. |
| 2004/0247252 A1 | 12/2004 | Ehrenreich et al. |
| 2005/0079750 A1 | 4/2005 | Foster |
| 2005/0176308 A1 | 8/2005 | Gurreri |
| 2005/0191010 A1 | 9/2005 | Gurreri |
| 2005/0261798 A1 | 11/2005 | Litao |
| 2006/0040564 A1 | 2/2006 | Morrison et al. |
| 2006/0063436 A1 | 3/2006 | Gurreri |
| 2006/0148279 A1 | 7/2006 | German |
| 2007/0207667 A1 | 9/2007 | Caveney et al. |
| 2008/0057759 A1 | 3/2008 | Bolain |
| 2008/0113562 A1 | 5/2008 | Vaden |
| 2008/0124033 A1 | 5/2008 | Gurreri |
| 2008/0146056 A1 | 6/2008 | Caveney |
| 2009/0004904 A1 | 1/2009 | Caveney |
| 2009/0007609 A1 | 1/2009 | Obenshain |
| 2009/0047818 A1 | 2/2009 | Irwin et al. |
| 2009/0088027 A1 | 4/2009 | Morrison |
| 2009/0098760 A1 | 4/2009 | Gurreri |

FOREIGN PATENT DOCUMENTS

| | | |
|---|---|---|
| DE | 102007036620 | 2/2009 |
| DE | 102007036620 A1 | 2/2009 |
| EP | 0969299 A2 | 1/2000 |
| EP | 0969299 | 5/2000 |
| EP | 1450189 | 8/2004 |
| EP | 1450189 A1 | 8/2004 |
| JP | 2005084357 A | 3/2005 |
| WO | 2007016794 | 2/2007 |
| WO | 2007103689 A2 | 9/2007 |
| WO | 2008030353 A3 | 3/2008 |
| WO | 2008031018 A2 | 3/2008 |
| WO | 2009006400 A1 | 1/2009 |
| WO | 2009026149 A1 | 2/2009 |

OTHER PUBLICATIONS

PCT international search report for application No. PCT/2010/000358 dated Jul. 13, 2010.

UK search report for application No. GB 0903326.7 dated Jun. 17, 2009.

PCT international search report for application No. PCT/2010/000356 dated May 4, 2010.

Office Action to corresponding Chinese patent application, English translation, dated Jun. 24, 2013.

EPO Examination Report dated May 15, 2013.

* cited by examiner

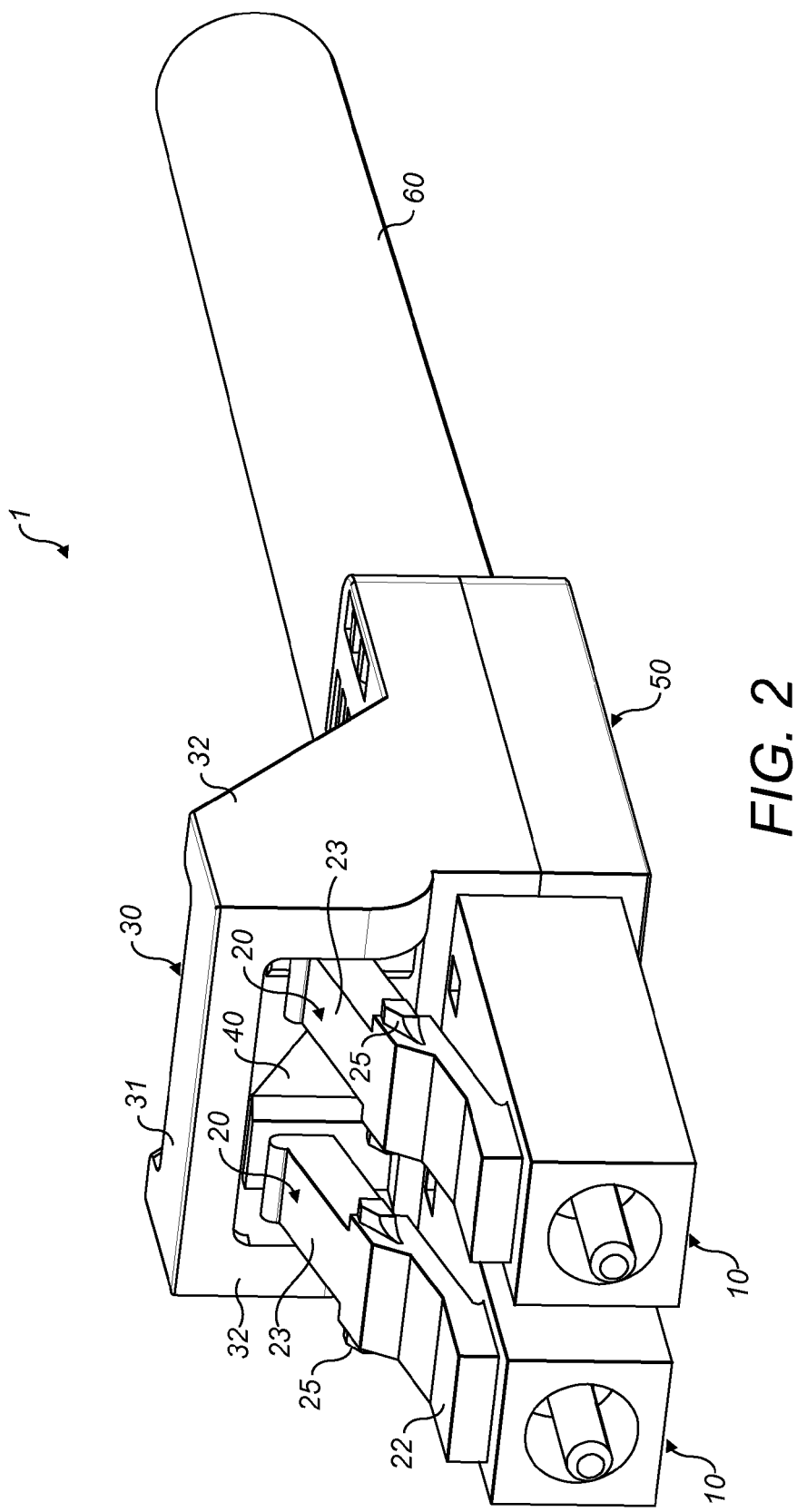

FIBRE OPTIC CONNECTOR ASSEMBLY AND ACCESS TOOL KIT

CROSS-REFERENCE TO RELATED APPLICATIONS

This application is a continuation of international application number PCT/GB2010/000356, filed Feb. 26, 2010, entitled "Fibre Optic Connector Assembly and Access Tool Kit," the entirety of which is hereby incorporated by reference. This application also claims priority to the following three applications previously filed in the United Kingdom (GB): (1) application number 0903326.7 filed on Feb. 26, 2009; (2) application number 0915728.0 filed on Sep. 8, 2009, and (3) application number 0917235.4, filed on Oct. 1, 2009; all three GB applications being hereby incorporated by reference in their entirety.

An optical fibre connector is used to terminate the end of an optical fibre for connection into a socket. When the connector is received into a socket, the optical fibre in the connector meets with an optical fibre in the socket providing a direct interface between the two optical fibres.

In many optical fibre connectors the means of connection to the socket is a snap fit. A latch mechanism is commonly employed such that when the latch is depressed the optical fibre connector is released from the push-fit connection with the socket. Applying pressure to the latch is quick and simple.

An example of a snap fit optical fibre connector is the Lucent Connector, commonly known as the LC connector. FIG. 1a shows a simplex LC connector while FIG. 1b shows a duplex LC connector.

Such a snap fit connector arrangement allows for simple reconfiguration of optical fibre paths, for example when wishing to redirect an optical fibre from one location to another.

Against this background, the present invention provides a fibre optic connector comprising: a first connector plug, which may be inserted into an associated socket in a first longitudinal direction; a first resilient leg, depending at a first end thereof from the first connector plug, and having a depressible part, distal therefrom, depressible towards the first connector plug, the first resilient leg having one or more lugs formed thereupon for engagement with a flange of a fibre optic socket; and a guard cover, configured to prevent access to the depressible part of the first resilient leg in its direction of depression, but to permit access to the first resilient leg in the first longitudinal direction through an access aperture, the access aperture being aligned with the depressible part of the first resilient leg on an axis parallel with the first longitudinal direction, to allow depression of the first resilient leg through the access aperture directly.

By aligning the access aperture with the depressible part of the resilient leg, it becomes possible to use a tool to depress the resilient directly. No intermediate pieces are therefore needed release the guard cover or to depress the resilient leg. This allows for easy manufacture of the connector and integral formation of the guard cover with the connector plug. Optionally, the resilient leg is also integrally formed with the connector plug. Moreover, the arrangement advantageously allows direct depression of the resilient leg using an associated tool, which provides secure protection to prevent depression of the resilient leg that is more robust to component failure, since a minimum number of moving parts are needed.

Ancillary to the invention is a fibre optic connector comprising: a first connector plug; a first resilient leg depending from the first connector plug and having one or more lugs formed thereupon for engagement with a flange of a fibre optic socket; and a guard cover positioned over the first resilient leg to inhibit depression thereof.

Preferably, the guard cover is positioned over the first resilient leg to inhibit manual depression thereof.

The fibre optic connector of the present invention thus inhibits manual removal of the connector from a push-fit socket into which it has been received. Hence it increases security by inhibiting removal by unauthorised parties. This, in turn, provides increased data security.

Advantageously, the connector of the present invention is compatible with standard pre-existing push-fit sockets.

In one embodiment, the fibre optic connector further comprises: a second connector plug, which may be inserted into an associated socket in a first longitudinal direction; a second resilient leg, depending at a first end thereof from the second connector plug, and having a depressible part, distal therefrom, depressible towards the second connector plug, the second resilient leg having one or more lugs formed thereupon for engagement with a flange of a fibre optic socket; and a guard cover, configured to prevent access to the depressible parts of the first resilient leg and the second resilient leg in their directions of depression, but to permit access to the first resilient leg and the second resilient leg in the first longitudinal direction through at least one access aperture, the at least one access aperture being aligned with the depressible part of the first resilient leg on an axis parallel with the first longitudinal direction and being aligned with the depressible part of the second resilient leg on an axis parallel with the first longitudinal direction, to allow depression of the first resilient leg and second resilient leg through the at least one access aperture directly.

In a second aspect, the present invention may be found in a fibre optic connector comprising: a first connector plug, a first resilient leg, depending at a first end thereof from the first connector plug, and having a depressible part, distal therefrom, depressible towards the first connector plug, the first resilient leg having one or more lugs formed thereupon for engagement with a flange of a fibre optic socket; and a guard cover, positioned over the first resilient leg to inhibit depression thereof and formed integrally with the first connector plug.

Optionally, the guard cover is configured to prevent access to the depressible part of the first resilient leg in its direction of depression, but to permit access to the first resilient leg in the first longitudinal direction through an access aperture, the access aperture being aligned with the depressible part of the first resilient leg on an axis parallel with the first longitudinal direction, to allow depression of the first resilient leg through the access aperture directly.

In one embodiment the fibre optic connector, further comprises: a second connector plug; a second resilient leg, depending at a first end thereof from the second connector plug, and having a depressible part distal therefrom, depressible towards the second connector plug, the second resilient leg having one or more lugs formed thereupon for engagement with a flange of the fibre optic socket; and the guard cover is positioned over the first resilient leg and the second resilient leg to inhibit depression thereof and formed integrally with the first connector plug and the second connector plug.

Optionally, the guard cover is configured to prevent access to the depressible parts of the first resilient leg and the second resilient leg in their directions of depression, but to permit access to the first resilient leg and the second resilient leg in the first longitudinal direction through at least one access aperture, the at least one access aperture being aligned with the depressible part of the first resilient leg on an axis parallel with the first longitudinal direction and being aligned with the depressible part of the second resilient leg on an axis parallel with the first longitudinal direction, to allow depression of the first resilient leg and second resilient leg through the at least one access aperture directly.

A number of features may be applicable to both first and second aspects of the present invention.

Preferably, the first connector plug is elongate and the first resilient leg extends generally along the axis of elongation.

Where the fibre optic connector has a second connector plug, it may be elongate and the second resilient leg extends generally along the axis of elongation.

More preferably, the first and second connector plugs extend in a direction generally parallel with each other. Optionally, the first and second connector plugs are parallel with the said axis of elongation.

Beneficially, the guard cover extends in the first longitudinal direction at least to the location of a front face of the associated socket, when the first connector plug is fully inserted into the associated socket, so as to prevent access to the first resilient leg in its direction of depression. This is so as to prevent access to the first resilient leg in its direction of depression. In particular, this mitigates the possibility of accessing the first resilient leg at a location close to the front face of the associated socket. Where a second connector plug is additionally used, the guard cover may also prevent access to the second resilient leg in its direction of depression.

In some embodiments, the guard cover comprises a bridge over the first resilient leg, the bridge having supports surrounding the first resilient leg and a span joining the supports and spaced from the first resilient leg. Optionally, a region bounded by the bridge span, the bridge supports and the first connector plug defines an aperture. Preferably, the bridge further comprises at least one projection extending in the first longitudinal direction towards the first end of the first resilient leg to prevent access to the first resilient leg in its direction of depression. This prevents access to the first resilient leg at a location close to the front face of the associated socket.

In the preferred embodiment, one end of the projection is pivoted to the bridge. Then, the bridge may optionally further comprise a notch arranged such that a force in the longitudinal direction against the projection causes it to be pushed into the notch in the bridge. Advantageously, the projection is configured such that at least a portion of the projection extends in the first longitudinal direction towards the first end of the first and second resilient legs to prevent access to the first and second resilient legs in their direction of depression when the projection is pushed into the notch. This may be achieved by shaping the end of the projection that is not pivoted to the bridge accordingly. For example, the non-pivoted end of the projection may comprise a surface that is substantially horizontal when the projection is pushed into the notch.

Advantageously, the guard cover comprises a bridge over the first resilient leg, the bridge having supports surrounding the first resilient leg and a span joining the supports and spaced from the first resilient leg. Optionally, a region bounded by the bridge span, the bridge supports and the first connector plug defines the access aperture.

Beneficially, a region bounded by the bridge span, the bridge supports, the first connector plug and the second connector plug defines the access aperture. Optionally, the access aperture is further bounded by a barrier adjacent to the bridge. Advantageously, the barrier is shaped to act as a guide towards the access aperture. Preferably, the barrier comprises at least one ramp.

Preferably, the fibre optic connector further comprises a Radio Frequency Identification (RFID) tag.

The present invention also provides for a kit comprising the connector as described herein and a tool, the tool comprising: a tool body; a resilient arm depending from the tool body; and a tongue formed upon or adjacent a distal end of the resilient arm and adapted to pass through the guard cover of the connector to engage directly and depress the one or more resilient legs of the connector.

Preferably, in use, the tongue of the tool is adapted to pass inside the guard cover and urge against the one or more resilient legs of the connector. Optionally, the tongue of the tool is formed as a key comprising one or more notches and/or one or more protrusions.

A further aspect of the present invention provides for a kit comprising: the fibre optic connector described herein; and a cap for removal of the tool from the guard cover of the fibre optic connector.

More preferably, one or more of the kits of the present invention may further comprise a cap for removal of the tool from the guard cover of the fibre optic connector.

In another aspect, the present invention resides in a tool for releasing a fibre optic connector from an associated socket, comprising: a tool body defining an inner volume for receiving a portion of the fibre optic connector; a resilient arm depending from the tool body; and a tongue formed upon or adjacent a distal end of the resilient arm.

Preferably, the tongue comprises at least one of: one or more notches; and one or more protrusions.

In a further aspect, there is provided a cap for a fibre optic connector, the cap being generally elongate and comprising: a cap body that defines an inner volume for receiving a front portion of the fibre optic connector, having a plurality of electrical contacts; and an arm projecting from the cap body along the direction of elongation.

Advantageously, the arm is ramp-shaped at its distal end. Preferably, the cap further comprises a flange for abutting a lug on the fibre optic connector. Optionally, the cap, further comprises a resilient clip depending from the cap body, and the flange is formed on the resilient clip.

The present invention also provides a method of inhibiting removal of a fibre optic connector from a fibre optic socket, the method comprising the steps of: providing a fibre optic connector having: a connector plug, which may be inserted into the fibre optic socket in a longitudinal direction; and a resilient leg depending, at a first end from the connector plug and having a depressible part, distal therefrom, depressible towards the first connector plug, the resilient leg having one or more lugs formed thereupon for engagement with a flange of a fibre optic socket; and providing a guard cover upon the fibre optic connector, configured to prevent access to the depressible part of the first resilient leg in its direction of depression, but to permit access to the first resilient leg in the first longitudinal direction through an access aperture, the access aperture being aligned with the depressible part of the first resilient leg on an axis parallel with the first longitudinal direction, to allow depression of the first resilient leg through the access aperture directly.

The present invention further provides a method of actuating a resilient leg of a fibre optic connector, the connector comprising: a connector plug, which may be inserted into an associated socket in a first longitudinal direction; a resilient leg depending at a first end thereof from the connector plug, and having a depressible part, distal therefrom, depressible towards the first connector plug, the first resilient leg having one or more lugs formed thereupon for engagement with a flange of a fibre optic socket and arranged such that its depressible part may be depressed towards the connector plug; and a guard cover, configured to prevent access to the depressible part of the first resilient leg in its direction of depression, but to permit access to the first resilient leg in the first longitudinal direction for its depression. The method comprises: passing a tool in the longitudinal direction of the connector plug, beneath the guard cover of the connector; and applying the tool directly to the depressible part of the resilient leg.

Also, there is provided a kit comprising a fibre optic connector and an associated tool configured to carry this the method.

In another aspect the present invention provides a method of extracting a fibre optic connector comprising a guard cover from a fibre optic socket, using a tool having a resilient leg and a tongue formed upon or adjacent a distal end of the resilient leg. The method comprises: passing the tongue through the guard cover of the connector; and directly engaging with and depressing the resilient leg of the connector.

There is also provided a method of extracting a fibre optic connector from a socket, the fibre optic connector having a connector plug and a resilient leg depending from the connector plug, a proximal end of the resilient leg being engaged with the socket so as to prevent removal of the fibre optic connector from the socket. The method comprises: inserting an extraction tool into the fibre optic connector such that the extraction tool depresses the resilient leg directly and thereby disengages the resilient leg from the socket; and extracting the fibre optic connector from the socket.

Preferably, the resilient leg has a depressible part distal from its proximal end, the fibre optic connector further comprises a guard cover, configured to prevent access to the depressible part of the resilient leg in its direction of depression, but to permit access to the resilient leg through an access aperture in a longitudinal direction, in which the connector plug can be inserted into a socket, the access aperture being aligned with the depressible part of the resilient leg on an axis parallel with the longitudinal direction, to allow depression of the resilient leg through the access aperture directly, and the step of inserting the extraction tool comprises accessing the resilient leg along that longitudinal direction.

More preferably, the access aperture is defined by the resilient leg and the guard cover.

In the preferred embodiment, the fibre optic connector further comprises a barrier element located adjacent the depressible part of the resilient leg, and the access aperture is defined by the resilient leg, the guard cover and the barrier element. Beneficially, the barrier is shaped to act as a guide towards the access aperture. Optionally, the barrier comprises at least one ramp.

Advantageously, the extraction tool comprises a tongue. Then, the method may further comprises: aligning one or both of: projections; and notches on the tongue with corresponding one or both of: notches; and projections on the guard arrangement.

Optionally, the step of inserting the extraction tool into the fibre optic connector comprises engaging the extraction tool with the fibre optic connector, said engagement preventing removal of the extraction tool from the fibre optic connector.

Beneficially, the method may further comprise: disengaging the extraction tool from the fibre optic connector by inserting the fibre optic connector into one of: a socket; and a cap; and removing the extraction tool from the fibre optic connector.

The present invention may also be found in a fibre optic loopback connector comprising: a first connector plug, which may be inserted into an associated socket in a first longitudinal direction; a first resilient leg, depending at a first end thereof from the first connector plug, and having a depressible part, distal therefrom, depressible towards the first connector plug, the first resilient leg having one or more lugs formed thereupon for engagement with a flange of a fibre optic socket; a second connector plug, which may be inserted into an associated socket in the first longitudinal direction; a second resilient leg, depending at a first end thereof from the second connector plug, and having a depressible part, distal therefrom, depressible towards the second connector plug, the second resilient leg having one or more lugs formed thereupon for engagement with a flange of a fibre optic socket; a guard cover, configured to prevent access to the depressible parts of the first resilient leg and the second resilient leg in their directions of depression, but to permit access to the first resilient leg and the second resilient leg in the first longitudinal direction through at least one access aperture, the at least one access aperture being aligned with the depressible part of the first resilient leg on an axis parallel with the first longitudinal direction and being aligned with the depressible part of the second resilient leg on an axis parallel with the first longitudinal direction, to allow depression of the first resilient leg and second resilient leg through the at least one access aperture directly; and an optical fibre having a first end and a second end. The first end is exposed at an end of the first connector plug and the second end is exposed at an end of the second connector plug such that the optical fibre provides a loop between the first plug and the second plug.

In further aspect, the present invention may reside in a fibre optic loopback connector comprising: a first connector plug; a first resilient leg, depending at a first end thereof from the first connector plug, and having a second end, distal therefrom, depressible towards the first connector plug, the first resilient leg having one or more lugs formed thereupon for engagement with a flange of a fibre optic socket; a second connector plug; a second resilient leg, depending at a first end thereof from the second connector plug, and having a depressible part, distal therefrom, depressible towards the second connector plug, the second resilient leg having one or more lugs formed thereupon for engagement with a flange of a fibre optic socket; a guard cover, positioned over the first resilient leg to inhibit depression thereof and formed integrally with the first connector plug; and an optical fibre having a first end and a second end. The first end is exposed at an end of the first connector plug and the second end is exposed at an end of the second connector plug such that the optical fibre provides a loop between the first plug and the second plug.

In one embodiment, the optical fibre attenuates a signal which passes therethrough. Optionally, the fibre optic loopback connector further comprises an insignia associated with a particular coefficient of attenuation provided by the optical fibre.

Optionally, the guard cover comprises a bridge over the first and second resilient legs, the bridge having supports surrounding the first and second resilient legs and a span joining the supports and spaced from the first and second resilient legs. Preferably, a region bounded by the bridge span, the bridge supports, the first connector plug and the second connector plug defines the access aperture. Optionally, the access aperture is further bounded by a barrier adjacent to the bridge. Advantageously, the barrier is shaped to act as a guide towards the access aperture; optionally, the barrier comprises at least one ramp.

Preferably, the fibre optic loopback connector further comprises a Radio Frequency Identification (RFID) tag.

Advantageously, the optical fibre is 900 µm optical fibre. Optionally, the optical fibre is 250 µm optical fibre.

In a yet further aspect, the present invention may be found in a blanking plug for a fibre optic socket, the plug comprising: a first connector plug, which may be inserted into an associated socket in a first longitudinal direction; a first resilient leg, depending at a first end thereof from the first connector plug, and having a depressible part, distal therefrom, depressible towards the first connector plug, the first resilient leg having one or more lugs formed thereupon for engagement with a flange of a fibre optic socket; and a guard cover, configured to prevent access to the depressible part of the first resilient leg in its direction of depression, but to permit access to the first resilient leg in the first longitudinal direction through an access aperture, the access aperture being aligned with the depressible part of the first resilient leg on an axis parallel with the first longitudinal direction, to allow depression of the first resilient leg through the access aperture directly.

The present invention may also be found in a blanking plug for a fibre optic socket, the plug comprising: a first connector plug; a first resilient leg, depending at a first end thereof from the first connector plug, and having a depressible part, distal therefrom, depressible towards the first connector plug, the first resilient leg having one or more lugs formed thereupon for engagement with a flange of a fibre optic socket; and a guard cover, positioned over the first resilient leg to inhibit depression thereof and formed integrally with the first connector plug.

Preferably, the first connector plug comprises a stopper for engagement with a fibre optic socket.

More preferably, the guard cover comprises a bridge over the first resilient leg, the bridge having supports surrounding the first resilient leg and a span joining the supports and spaced from the first resilient leg. Optionally, a region bounded by the bridge span, the bridge supports and the first connector plug defines the access aperture. Preferably, the access aperture is further bounded by a barrier adjacent to the bridge. Advantageously, the barrier is shaped to act as a guide towards the access aperture. Optionally, the barrier comprises at least one ramp. In the preferred embodiment, the underside of the bridge span has formed therein one or more notches and/or one or more protrusions.

In the preferred embodiment, the blanking plug further comprises: a second connector plug; and a second resilient, depending at a first end thereof from the second connector plug, and having a depressible part, distal therefrom, depressible towards the second connector plug, the second resilient leg having one or more lugs formed thereupon for engagement with a flange of a fibre optic socket. The guard cover is positioned over the first and second resilient legs.

Optionally, the second connector plug comprises a stopper for engagement with a fibre optic socket.

In some embodiments, the blanking plug further comprises a Radio Frequency Identification (RFID) tag.

In an alternative aspect, there may be provided a blanking plate comprising: a plate; at least one blanking plug as described herein, fitted on the plate such that the plate covers a plurality of fibre optic sockets when the at least one blanking plug is fitted into an associated socket.

Optionally, the blanking plate further comprises a blanking plug mount for fixing the blanking plug to the plate, the blanking plug mount being arranged to allow adjustment of the position of the blanking plug on the plate. Beneficially, the blanking plug mount may comprise runners mounted on a hole in the plate and a sliding mechanism adapted to allow the blanking plug to slide within the hole of the plate.

Also provided is a patch panel comprising a plurality of fibre optic sockets, wherein at least one of the fibre optic sockets is occupied either by a fibre optic loopback connector or by a blanking plug.

In some embodiments, every one of the sockets is occupied by: a fibre optic loopback connector; a blanking plug; or a fibre optic connector.

Optionally, at least one of the sockets is occupied by a blanking plug, wherein the blanking plug is as described herein. Additionally or alternatively, at least one of the sockets is occupied by a fibre optic loopback connector, wherein the fibre optic loopback connector is as described herein. Additionally or alternatively, at least one of the sockets is occupied by a fibre optic connector, wherein the fibre optic connector is as described herein.

Advantageously, therefore, the patch panel may be provided to the customer fully populated so that the customer can be confident that only those with a corresponding removal tool can have removed the blanking plugs in order to accesses the sockets in the patch panel.

SPECIFIC DESCRIPTION

Embodiments of the present invention will now be described, by way of example only, with reference to the accompanying drawings, in which:

FIG. 2 shows a perspective view of an embodiment of the fibre optic connector of the present invention;

FIG. 13b shows a side view of the embodiment of FIG. 13a;

FIG. 14b shows a side view of the embodiment of FIG. 14a;

FIG. 15b shows a side view of the embodiment of FIG. 15a;

FIG. 16b shows a perspective view of the embodiment of FIG. 16a;

FIG. 16c shows a top view of the embodiment of FIG. 16a;

FIG. 17b shows a rear end view of the blanking plug of FIG. 17a;

FIG. 17c shows a side view of the blanking plug of FIG. 17a.

FIG. 17d shows a front end view of the blanking plug of FIG. 17a;

FIG. 17e shows a perspective view of the blanking plug of FIG. 17a;

FIG. 19b shows a rear end view of the embodiment of FIG. 19a;

FIG. 19c shows a side view of the embodiment of FIG. 19a;

FIG. 19d shows a front end view of the embodiment of FIG. 19a; and

FIG. 19e shows a perspective view of the embodiment of FIG. 19a.

Figure 9:
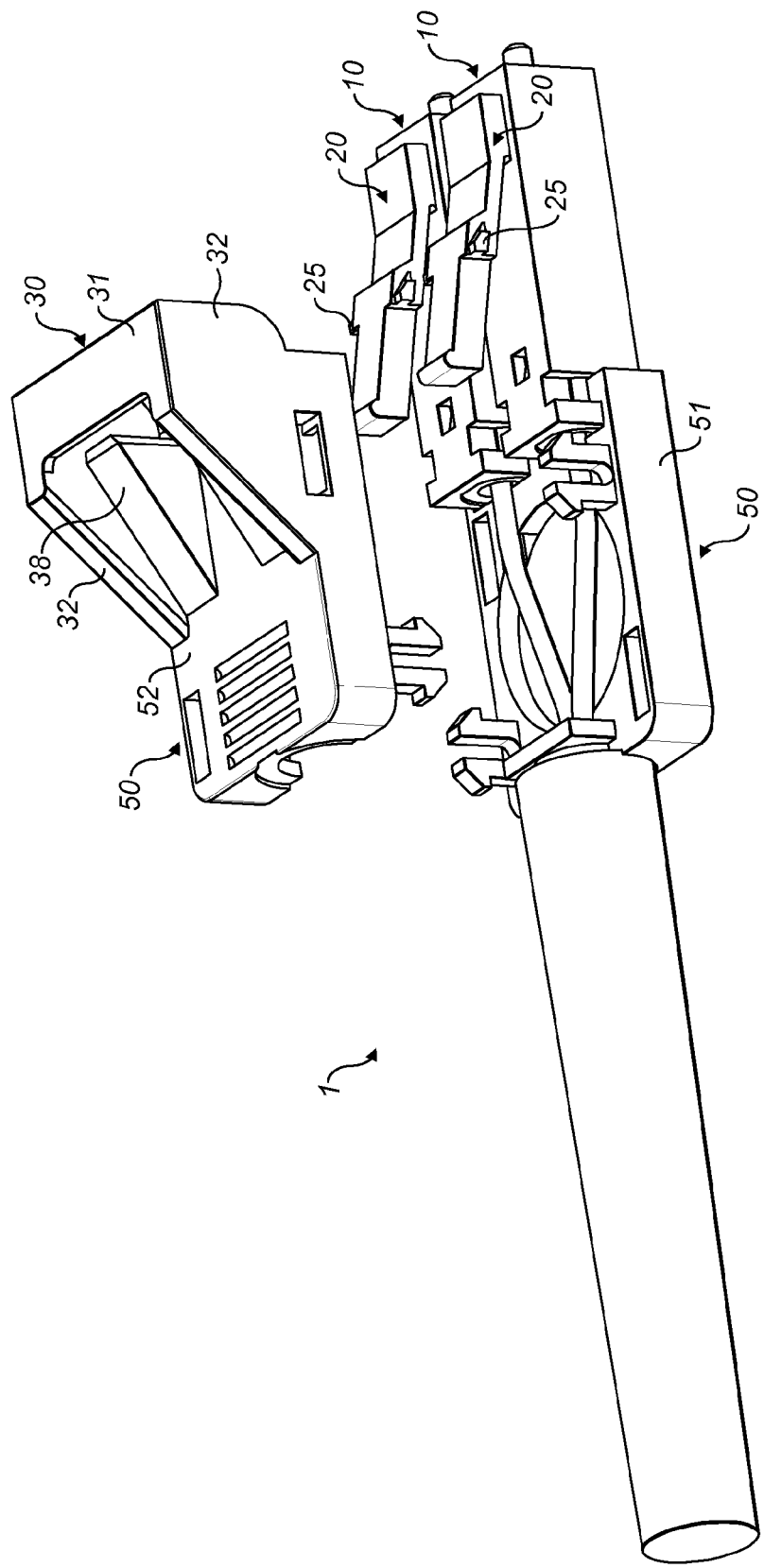
FIG. 9 shows an exploded perspective view of the connector of FIG. 2.

A fibre optic connector embodying the present invention is shown in FIG. 2 (and, in exploded form, in FIG. 9). The fibre optic connector 1 has a housing 50 and two connector plugs 10.

The housing 50 comprises a lower part 51 and an upper part 52. The housing 50 encapsulates the proximal ends of the connector plugs 10 between the lower part 51 and the upper part 52. The lower part 51 and upper part 52 snap fit together. The upper part 52 of the housing 50 includes an integrally moulded guard cover 30

Each connector plug 10 is elongate and comprises a resilient leg 20 which depends at one end of the leg 20 from an end of the connector plug 10 opposite to the housing 50. Each resilient leg 20 extends generally along the axis of elongation of the connector plug 10. A lug 25 is formed on each side of each resilient leg 20 so as to protrude from the leg 20 in an direction perpendicular to the axis of elongation.

The guard cover 30 is positioned over the ends 23 of the resilient legs away from the ends 22 at which each resilient leg 20 depends from the connector plug 10.

The guard cover 30 comprises a bridge with a span 31 and two supports 32. The span 31 covers both resilient legs. The supports 32 are located at the ends of the span 31. On the underside of the span 31 there is formed one or more protrusions and/or one or more notches 35 (See FIGS. 4 and 17b).

The guard cover 30 comprises a bridge with a span 31 and two supports 32. The span 31 covers both resilient legs. The supports 32 are located at the ends of the span 31. On the underside of the span 31 there is formed one or more protrusions and/or one or more notches 35.

The guard cover 30 further comprises two ramps 38 on the side of the guard cover 30 opposite the resilient legs 20 of the connector plugs 10.

A region bounded by the bridge span 31, the bridge supports 32 and the two connector plugs defines an aperture.

Two optical fibres 60 pass through the housing 50 before each is received into one of the two connector plugs 10.

In use, the optical fibre connector 1 is received into a fibre optic socket (not shown). On entry into the socket, the ends 23 of the resilient legs 20 are forced downwards towards the connector plugs by the perimeter of the socket. Once the lugs 25 formed on the resilient legs 20 have moved downwards sufficiently to allow entry of the connector plugs into the socket, the resilient legs 20 spring back so that the lugs 25 are restrained by a flange in the socket which inhibits removal of the connector 1 from the socket.

Subsequent removal of the connector 1 from the socket is achieved by depressing the ends 23 of the resilient legs 20 such that the lugs 25 pass below the restraining flange of the socket. Since the ends 23 of the resilient legs 20 are located under the guard cover, however, it is not possible to depress the resilient legs 20 manually. Instead, in order to remove the connector 1 from the socket, it is necessary to use a corresponding removal tool.

Figure 1A:
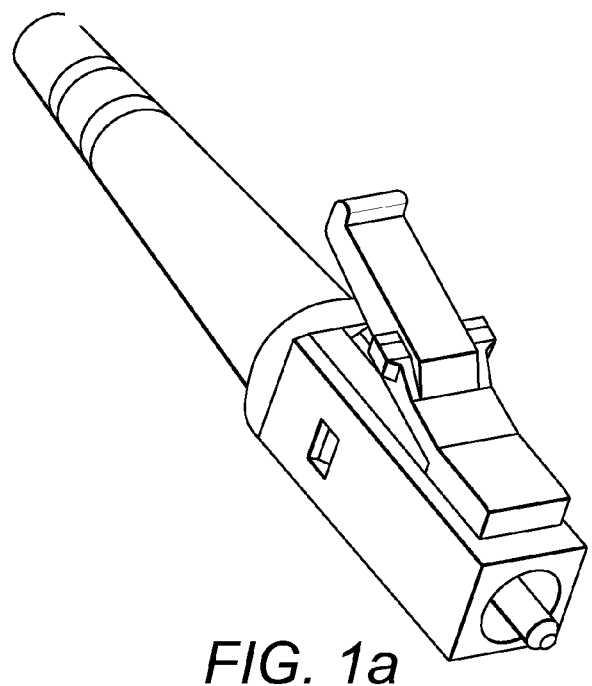
FIG. 1a shows a perspective view of a prior art simplex LC connector.
Figure 1B:
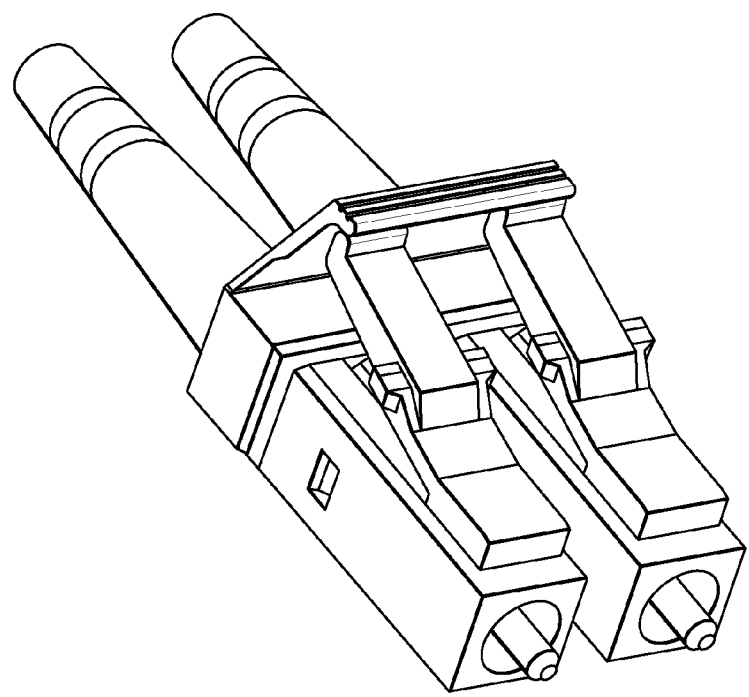
FIG. 1b shows a perspective view of a prior art duplex LC connector.
Figure 3:
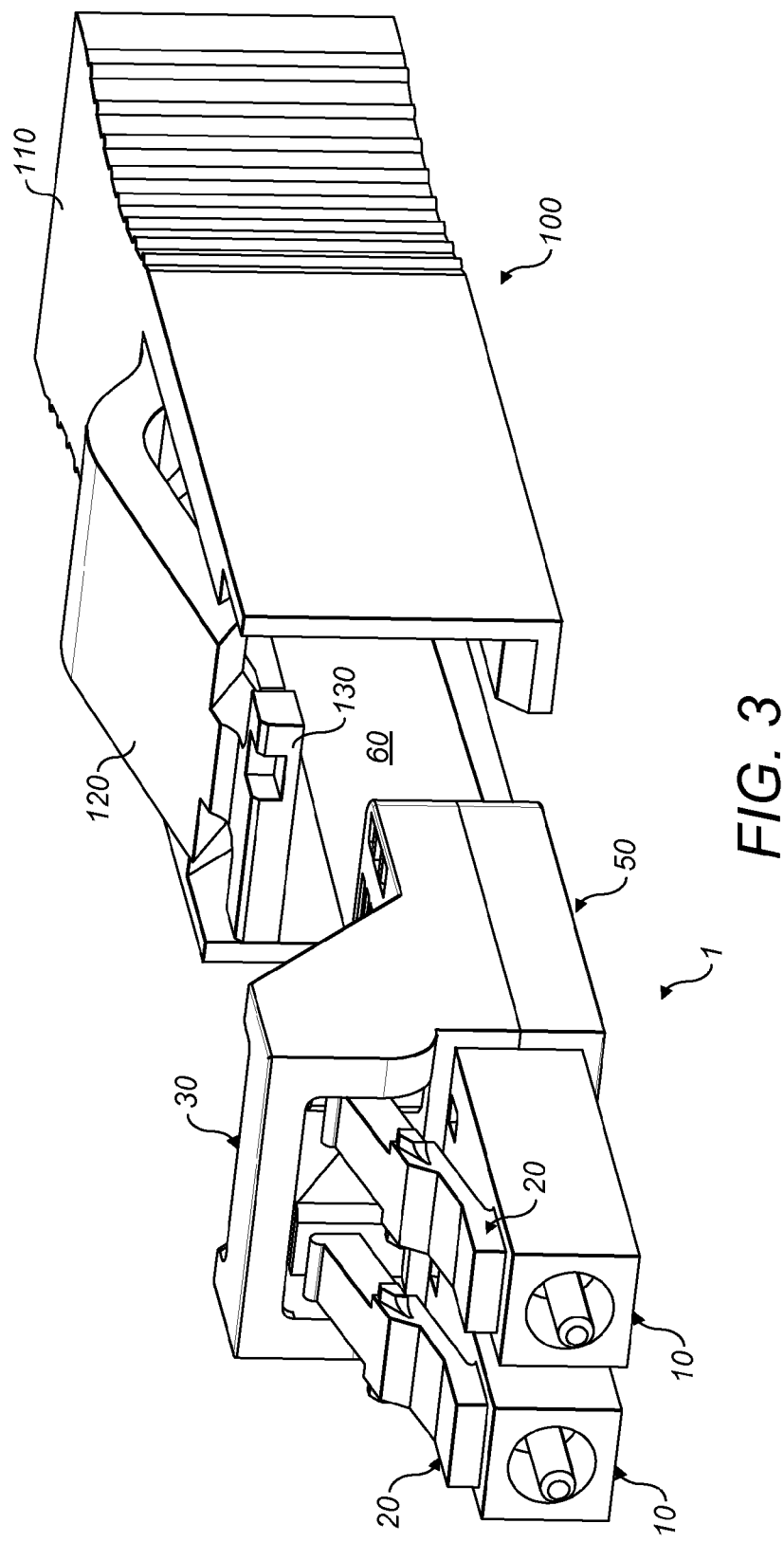
FIG. 3 shows a perspective view of a tool embodying the present invention shown adjacent to the fibre optic connector of FIG. 2.

FIG. 3 shows the tool 100 of the present invention alongside the fibre optic connector 1 of FIG. 2.

The tool 100 comprises a tool body 110, a resilient arm 120 depending from the tool body and a tongue 130 formed at the distal end of the resilient arm. The tool body 110 includes a recess adapted so that, when in use, it will at least partly surround an optical fibre 60 connected to the fibre optic connector 1. The resilient arm 120 is typically more resilient than the resilient leg 10 of the connector 1. The shape of the tongue 130 is adapted to fit through (match) the aperture under the bridge span. In particular, where the bridge span 31 or supports 32 include one or more protrusions and/or one or more notches 35, the shape of the tongue is adapted to cooperate with the one or more protrusions and/or one or more notches 35 (See FIGS. 4 and 17b).

The tool 100 comprises a tool body 110, a resilient arm 120 depending from the tool body and a tongue 130 formed at the distal end of the resilient arm. The tool body 110 includes a recess adapted so that, when in use, it will at least partly surround an optical fibre 60 connected to the fibre optic connector 1. The resilient arm 120 is typically more resilient than the resilient leg 10 of the connector 1. The shape of the tongue 130 is adapted to fit through (match) the aperture under the bridge span. In particular, where the bridge span 31 or supports 32 include one or more protrusions and/or one or more notches 35, the shape of the tongue is adapted to cooperate with the one or more protrusions and/or one or more notches 35.

In use, the tool 100 is positioned parallel to the elongate direction of the connector plugs on the side of the guard cover 30 away from the resilient legs 20. The tool is aligned by ensuring that the optical fibre is at least partly enclosed by the recess of the tool 100.

The tool 100 is then moved in a forward direction generally parallel to the direction of elongation, towards the guard cover 30. The resilient arm 120 of the tool 100 makes contact with the two ramps 38 of the connector. Further movement in that forward direction causes the resilient arm of the tool 100 to slide up the ramps 38. As stated above, the key 130 is adapted to fit through the aperture beneath the bridge span 31. Continued movement of the tool 100 will cause the tongue 130 to pass through the aperture beneath the bridge span 31. Once the tongue 130 has passed through the aperture, the tongue 130 makes contact with the resilient legs 20 of the connector 1. Since the resilience of the resilient arm 120 of the tool 100 is typically greater that the resilience of the resilient legs 20 of the connector 1, the resilient arm 120 forces the resilient legs 20 downwards towards the connector plugs 10. Hence, the connector 1 is then removable from the socket through downward movement of the lugs 25 in the manner described above.

Once the connector 1 has been removed from the socket, the tool 100 remains attached to the connector 1 because the tongue 130 of the tool 100 remains on the leg side of the guard cover 30. Since the resilient arm of the tool 100 is more resilient than the resilient legs 20 of the connector 1, the tool cannot easily be removed from the connector 1.

Figure 4:
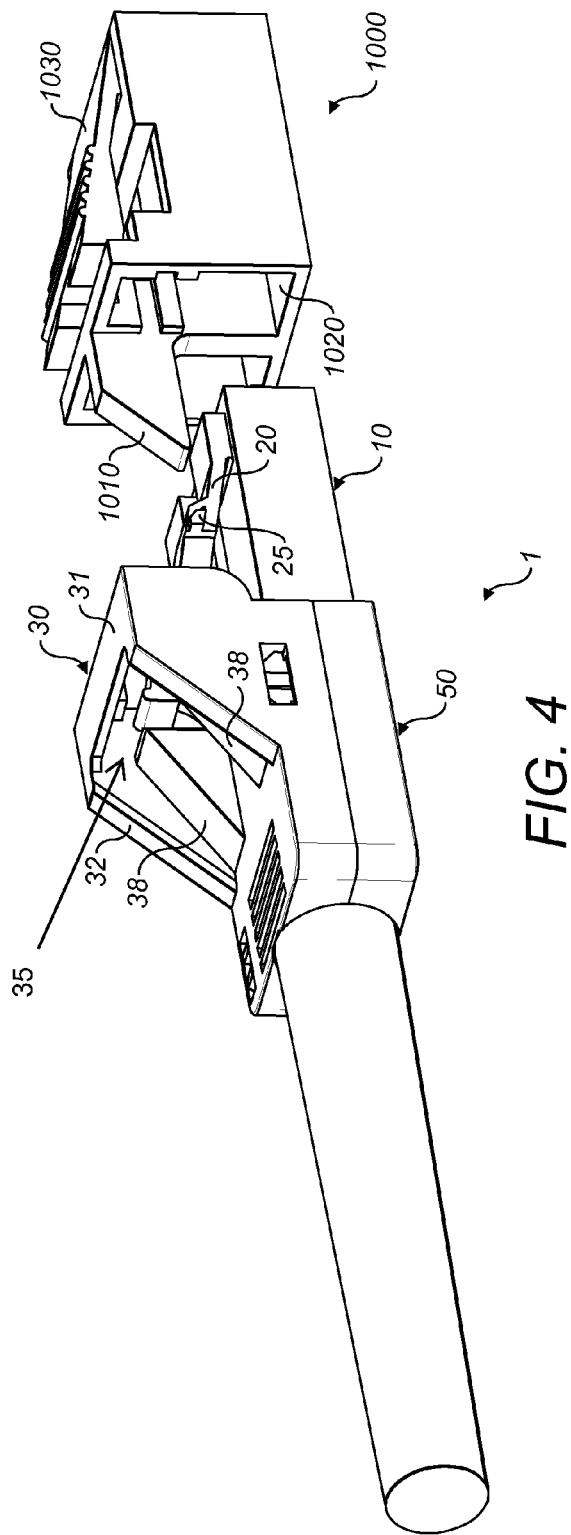
FIG. 4 shows the fibre optic connector of FIG. 2 together with an embodiment of a cap of the present invention.
Figure 5:
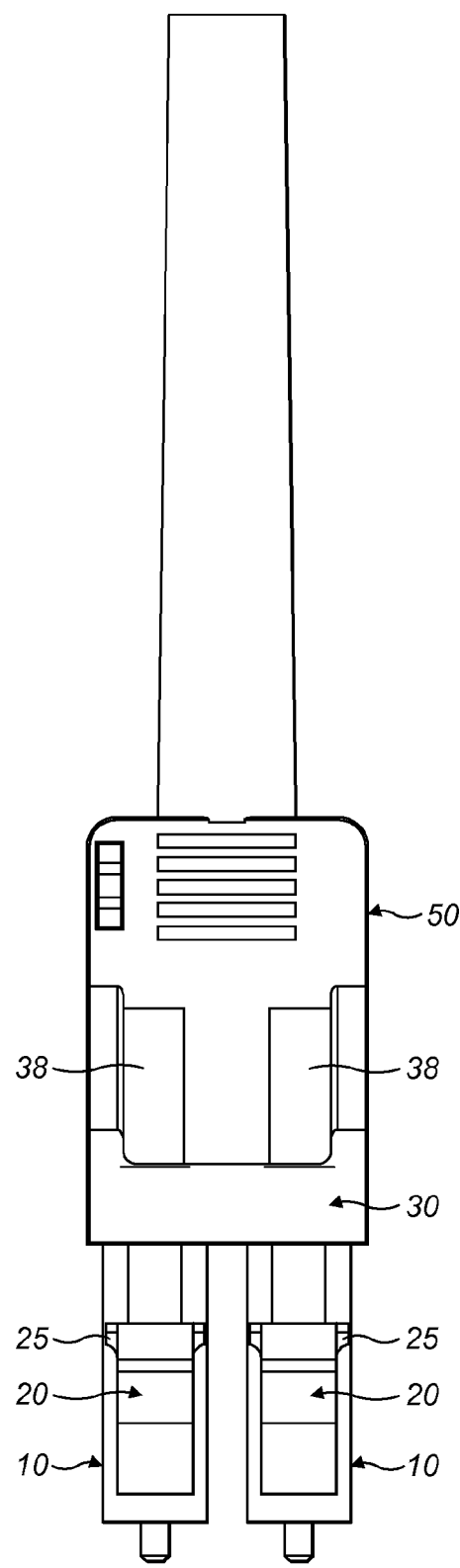
FIG. 5 shows a plan view of the fibre optic connector of FIG. 2.
Figure 6:
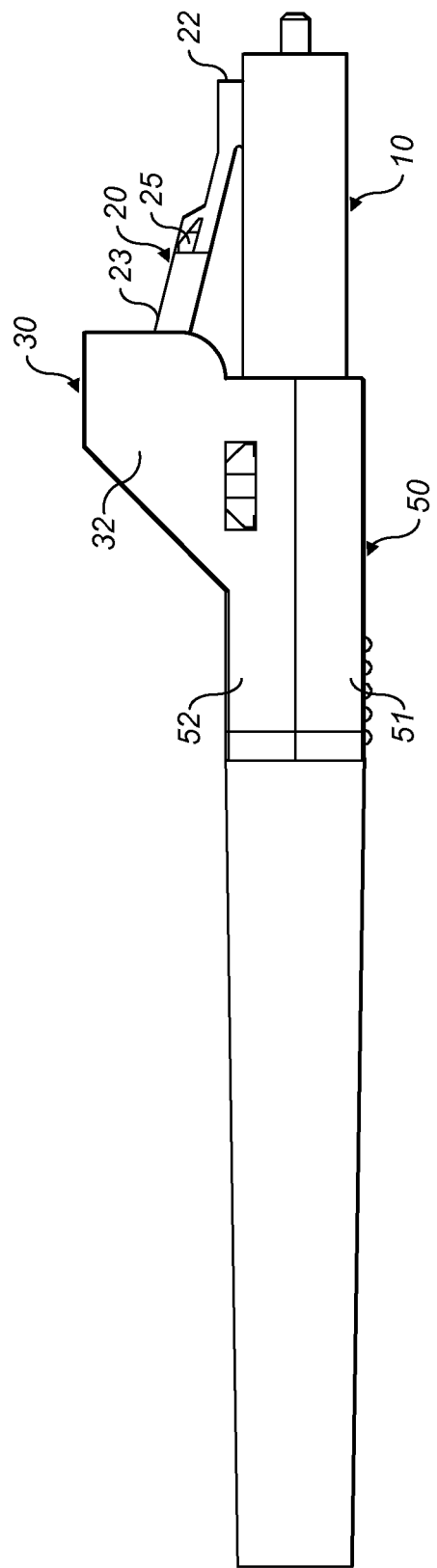
FIG. 6 shows a side view of the fibre optic connector of FIG. 2.
Figure 7:
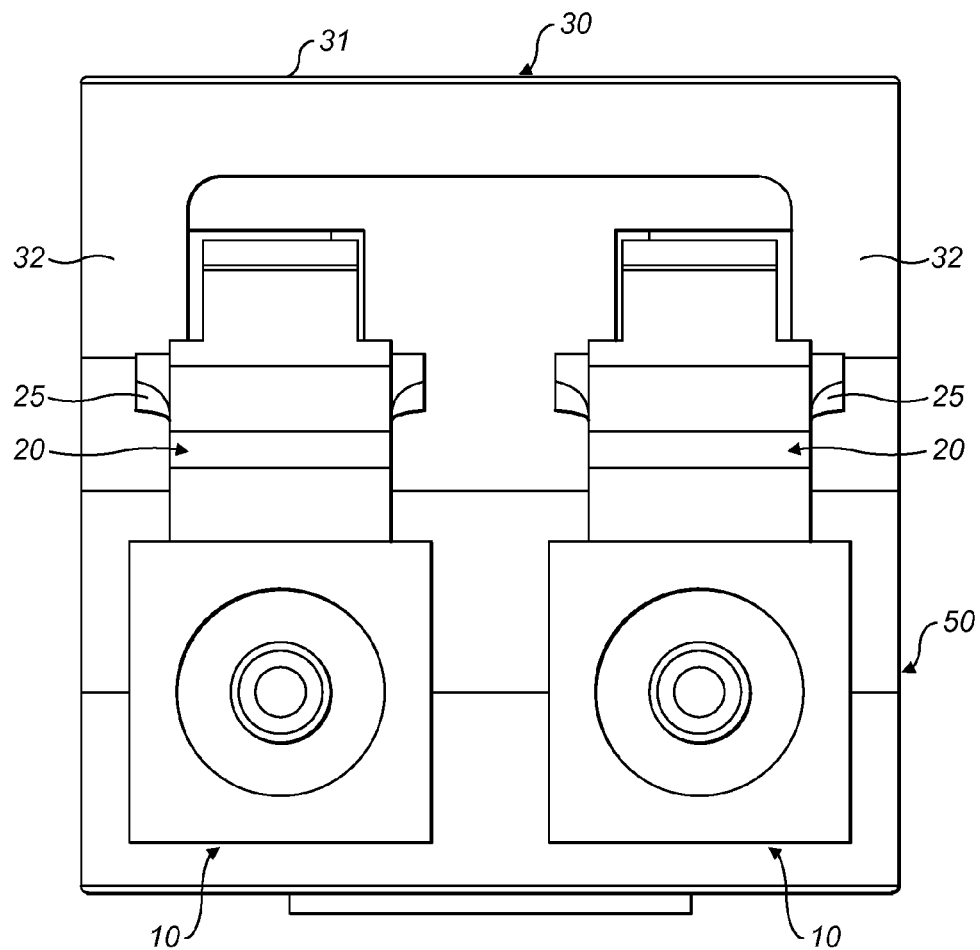
FIG. 7 shows an end view of the fibre optic connector of FIG. 2.
Figure 8:
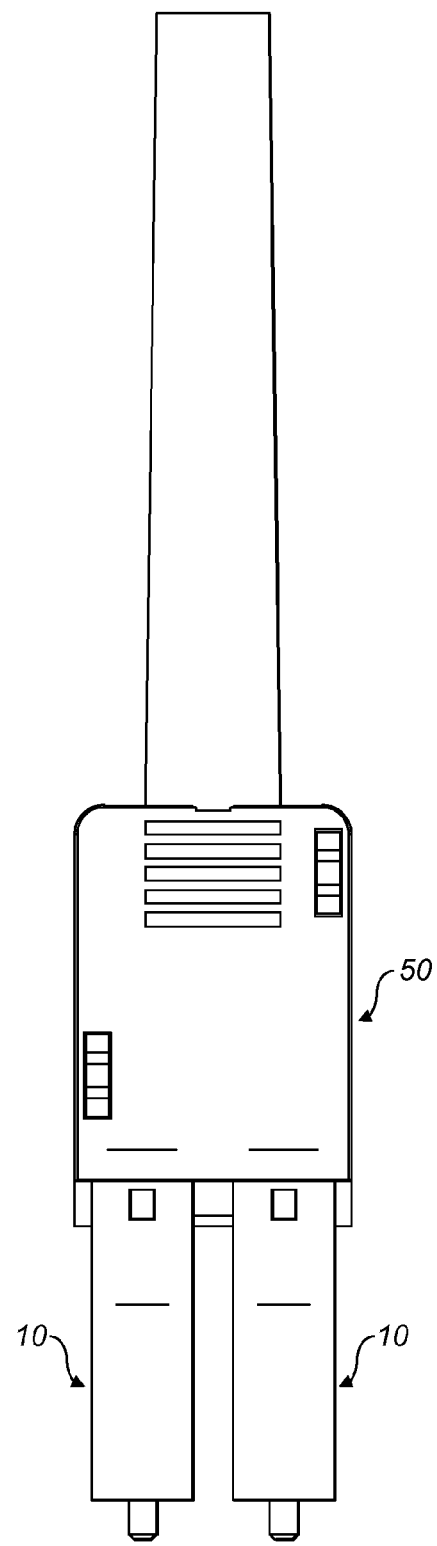
FIG. 8 shows a plan view (from the opposite direction to that of FIG. 5) of the fibre optic connector of FIG. 2.

There is also preferably provided, therefore, a cap 1000 as illustrated in FIG. 4. The cap 1000 comprises a cap ramp 1010 mounted at one end of the cap 1000 and two apertures 1020 adapted to receive the two connector plugs 10 of the connector 1. The cap further comprises a resilient clip 1030.

In use, the cap 1000 is moved towards the connector plugs 10 in a direction so as to receive the connector plugs 10 into the apertures 1020 of the cap 1000. In consequence of this movement, the cap ramp 1010 slides underneath the tongue 130 at the distal end of the resilient arm 120 of the extraction tool 100. With continued movement in the same direction the tongue 130 is forced up by the ramp 1010 which, in turn, forces the resilient arm 120 of the tool 100 up towards the aperture beneath the bridge span 31. Once the resilient arm 120 of the tool 100 is in line with the aperture beneath the bridge span 31 the tool 100 can be removed simply by moving the tool 100 in the direction of the optical fibre 60 away from the connector 1.

Also in consequence of the movement of the cap, the resilient legs 10 of the connector 1 are received beneath the resilient clip 1030 of the cap 1000 which holds the cap 1000 in place on the end of the connector 1. Thus, the cap will, by default, remain in place on the end of the fibre optic connector when the connector is not connected to a socket.

The connector, tool and cap may be made from a thermosetting plastic.

Since a very large number of arrangements of connector guard cover apertures is contemplated by the invention and each such arrangement has at least one corresponding tool, it may be that the corresponding connector and tool include some means of identification in order for the user easily to identify the correspondence between connector and tool. For example, corresponding connectors and tools may be formed in the same colour. The cap may also be formed in the same colour.

The housing 50 of the fibre optic connector 1 may comprise any number of components. The connector plugs 10 may be formed from the housing 50. The housing 50 may include a recess 53 for receiving a Radio Frequency Identification (RFID) tag.

Figure 10:
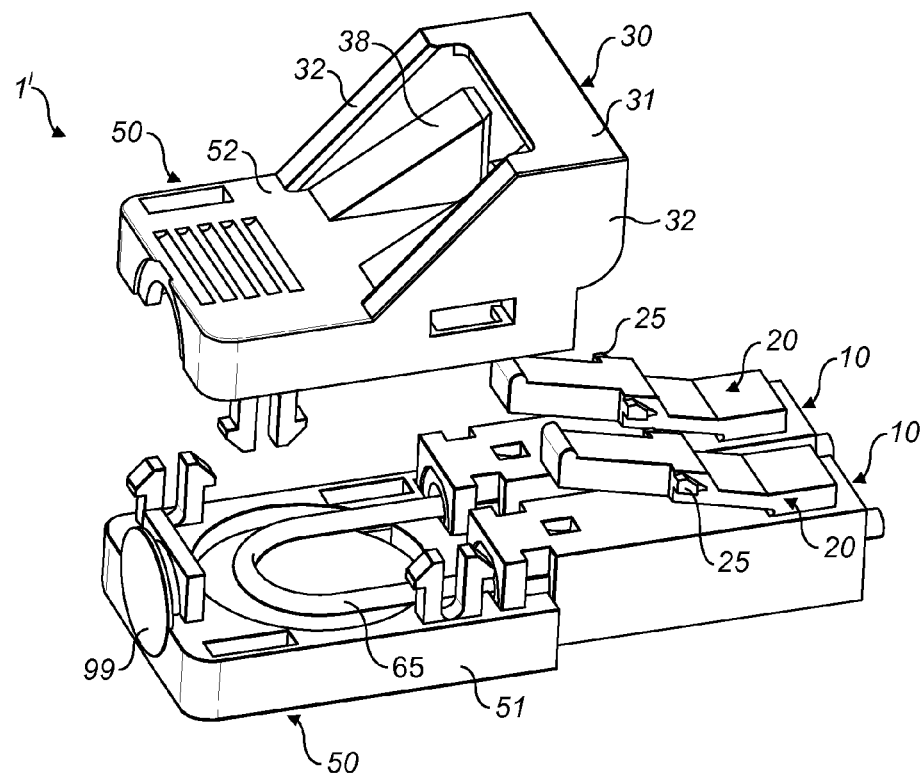
FIG. 10 shows an exploded perspective view of a fibre optic loopback connector according to an embodiment of the invention.

FIG. 10 shows a duplex fibre optic loopback connector 1'. The duplex fibre optic loopback connector 1' is similar to the duplex fibre optic connector 1, except that instead of having two optical fibres pass out of the connector (one for each connector plug, perhaps in a single insulated sheath as shown in FIG. 9), a single optical fibre 65 passes directly from the first connector plug 10 to the second connector plug 10. In use, therefore, when the duplex loopback connector 1' is received by a duplex socket, the signal from a first socket of the duplex socket will pass via the loop to a second socket of the duplex socket. In the specific example, the optical fibre is 900 µm optical fibre.

The loop of optical fibre 65 may be arranged so as to attenuate the signal which passes therethrough. This may be achieved, for example, by tightly coiling the loop of optical fibre so as to cause a proportion of the light passing therethrough to be transmitted out of the optical fibre rather than undergoing total internal reflection within the optical fibre. Alternatively, the ends of the optical fibre may be roughened so that, when received by a socket, only a portion of the ends of the optical fibre make contact with an optical fibre in the corresponding socket. Of course, any alternative means for attenuating the signal may be employed.

A fibre optic loopback connector may be provided with a specific level of attenuation such as 5 dB or 10 dB.

An insignia 99 may be provided to identify the level of attenuation (if any) provided by the fibre optic loopback connector 1'. In the embodiment illustrated in FIG. 10, the insignia is provided in the form of a coloured push-fit plug which is received into a socket in an end of the loopback fibre optic connector 1' opposite the connector plugs. The insignia may, of course, be anything appropriate to identify the level of attenuation. For example, the insignia may be an engraved marking, a portion of text, or an adhesive label.

Figure 11:
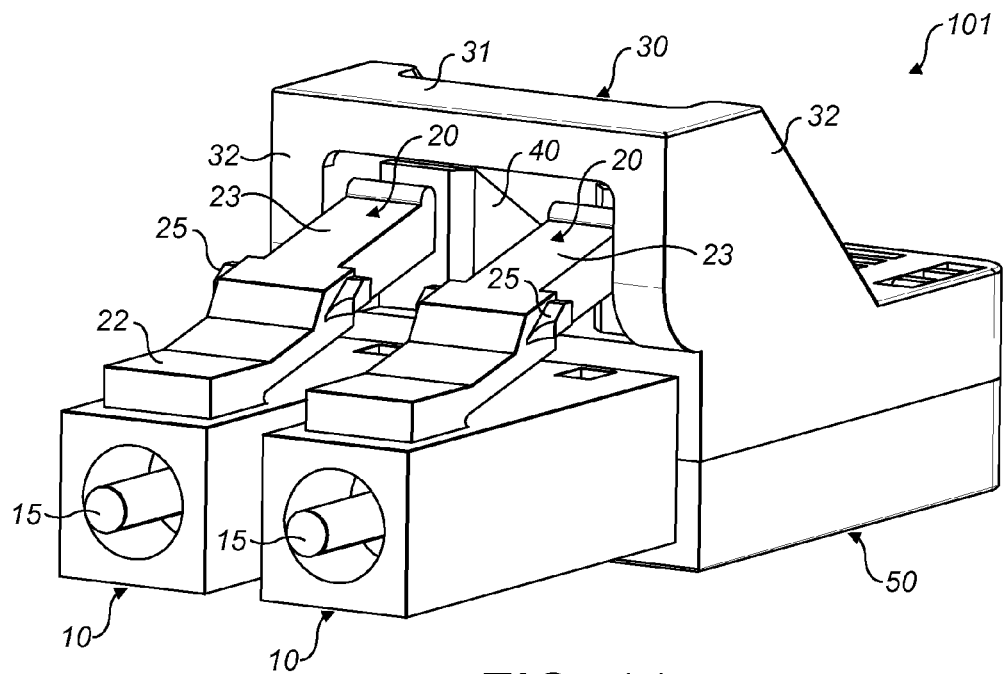
FIG. 11 shows a perspective view blanking plug according to an embodiment of the invention.

FIG. 11 shows a duplex blanking plug 101 according to an embodiment of the invention. The duplex blanking plug 101 of the specific example shown in FIG. 11 is similar to the fibre optic loopback connector 1' except that the optical fibre which runs down the axis of each connector plug is replaced by a similarly dimensioned cylindrical stopper 15. The blanking plug may be used to plug a socket when the socket is not being used to carry a signal. When the blanking plug is in use with a socket, the stopper prevents the ingress of dirt and contaminants which may, if allowed to enter, degrade signal quality when the socket is again used with a fibre optic connector once the blanking plug has been removed. By avoiding the use of optical fibre for the blanking plug, the cost of the plug may be reduced. It is also possible to avoid the need for spring means which are commonly used in LC connectors in order to ensure intimate contact of the fibre optic in the plug with the fibre optic in the socket. It is also not necessary to provide a ceramic ferrule which is commonly used in LC connectors to terminate the optical fibre. These provide further cost savings. The stopper may be made from material with appropriate physical properties, such as plastic, rubber or metal. However, it is of course possible for the blanking plug to comprise optical fibre and/or spring means and/or a ceramic ferrule so long as the configuration of the blanking plug is not such as to provide an optical path.

Where the blanking plug is provided with a guard which inhibits manual release of the blanking plug from a socket into which it is received, the blanking plug may only be removed using the corresponding tool. Advantageously, therefore, this prevents an unauthorised party from removing the blanking plug. This, in turn, prevents an unauthorised party from inserting an unauthorised fibre optic connector into the fibre optic socket.

Furthermore, the customer may be supplied with a patch board of sockets all of which are populated with a blanking plug. The guard of each blanking plug would render each blanking plug incapable of removal from its socket without the corresponding tool. This, in turn, prevents an unauthorised party from inserting an unauthorised fibre optic connector into any of the fibre optic sockets in the patch board.

While it will be noted that the preferred embodiment of the fibre optic connector comprises two connector plugs (in a duplex arrangement) each with a resilient leg and one guard cover over both legs, the invention, of course, also encompasses a fibre optic connector comprising any number of connector plugs with any number of resilient legs and any number of guard covers. In particular, an embodiment of the invention may comprise a simplex connector comprising only one connector plug with only one resilient leg and one guard cover over that leg.

Similarly, a blanking plug 101 of the invention may be provided with any number of connector plugs 10 each provided with a stopper 15; the blanking plug 101 is not limited to a duplex arrangement.

While a fibre optic loopback connector 1' of the invention must comprise at least two connector plugs 10 in order to provide the loop functionality, it is not necessarily limited to a duplex arrangement.

The connector 1 of the present invention also encompasses embodiments which comprise any number of ramps 38.

The guard cover of the fibre optic connector may have any number of protrusions and/or notches 35 and/or other obstructions located anywhere in the aperture formed partially by the guard cover including, but not limited to, the span 31 and the supports 32 of the bridge. Whatever the nature of the aperture, the tongue 130 of the tool is adapted to pass through the aperture in order to actuate the resilient legs 20.

The tool 100 and cap 1000 are of course preferably adapted to the particular embodiment of the connector 1. For example, it is necessary that the numbers of connector plugs 10 and resilient legs 20 of the connector 1 are accommodated by the features of the tool 100 and the cap 1000.

In the case where there is more than one connector plug and more than one resilient leg, there may be an additional component which joins two or more of the resilient legs.

In preferred embodiments, an additional security feature is provided. Specifically, the guard cover is arranged to extend in the first longitudinal direction (in other words, the direction of elongation of the plugs 10) at least to the location of a front face of the associated socket, when the plug 10 is fully inserted into the socket. This prevents access to the resilient leg (or legs) of the connector in its direction of depression. By providing this additional feature, accessing the resilient leg or legs at a location close to the front face of the associated socket is precluded. This additional security feature can implemented in a number of different ways, which will now be described.

Figure 12A:
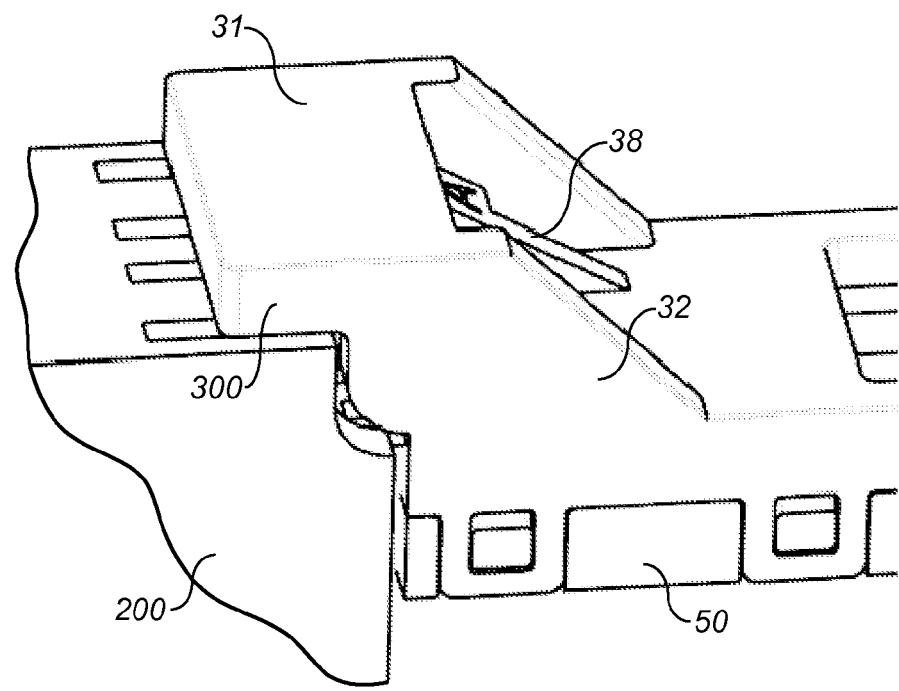
FIG. 12a shows a perspective view of a fibre optic connector and associated socket with a first additional security feature according to an embodiment of the invention.

In FIG. 12a, there is shown a perspective view of a fibre optic connector and associated socket with a first embodiment of the additional security feature. Where the same features are indicated as in other figures, identical reference numerals have been used. A bar 300 is additionally provided with span 31. When the connector is engaged with an associated socket 200, the bar 300 sits above the socket 200. In this way, the bar 300 prevents access to the ends 23 of the resilient legs immediately adjacent the front face of the socket 200. The bar 300 extends along the full width of the connector.

Figure 12B:
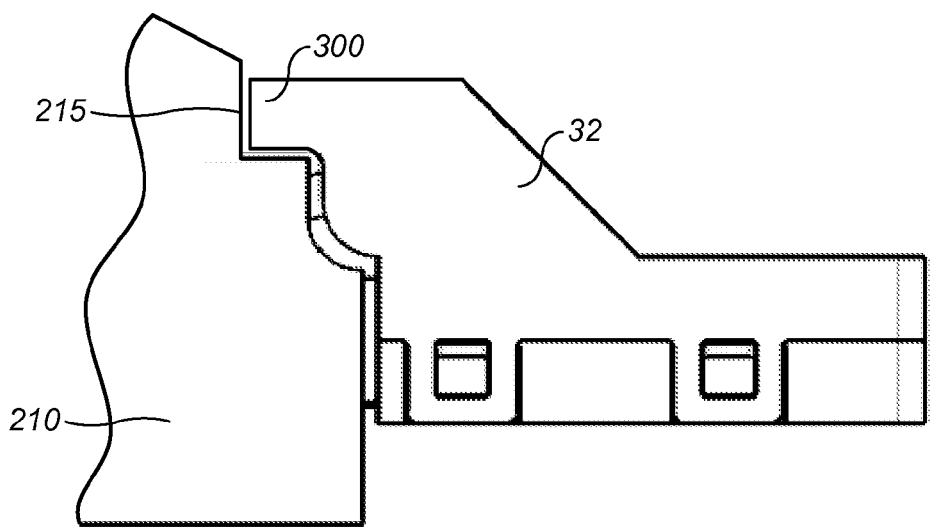
FIG. 12b shows a side view of the fibre optical connector embodiment of FIG. 12a when engaged with a keystone.

A side view of the embodiment of FIG. 12a is shown in FIG. 12b. In this view, the connector is engaged with a keystone 210. A notch 215 may be provided in the keystone 210 in order to accommodate the bar 300.

Figure 13A:
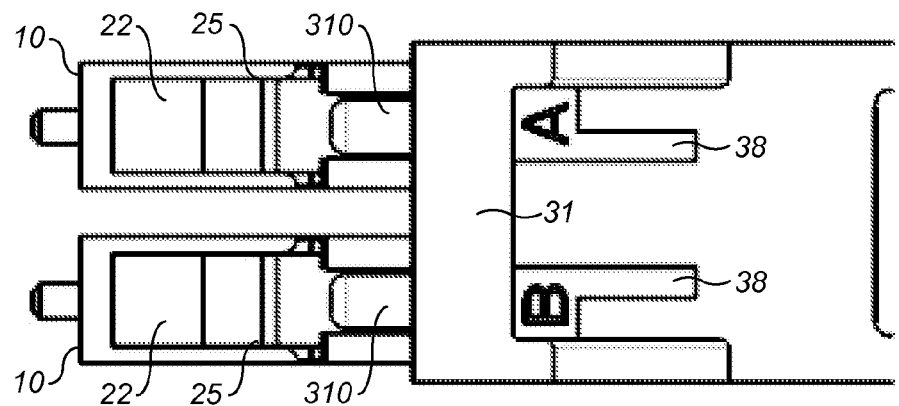
FIG. 13a shows a top view of a fibre optic connector with a second additional security feature according to an embodiment of the invention.
Figure 13B:
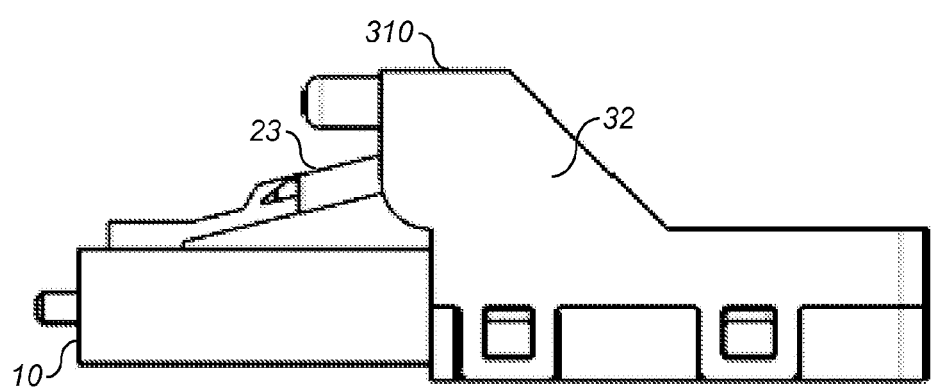

Rather than providing a bar 300, other kinds of projections may be alternatively employed. In FIG. 13a, there is shown a top view of a fibre optic connector with a second embodiment of the additional security feature. Projections 310 are positioned adjacent to the span 31 in alignment with the ends 23 of the resilient legs in the longitudinal direction (the direction of elongation of the plugs 10). Again, the projections or protrusions 310 prevent access to the ends 23 of the resilient legs in their direction of depression. FIG. 13b shows a side view of the embodiment of FIG. 13a. Also, notches may be provided in an associated keystone to accommodate the projections 310, as with the embodiment shown in FIG. 12b.

Figure 14A:
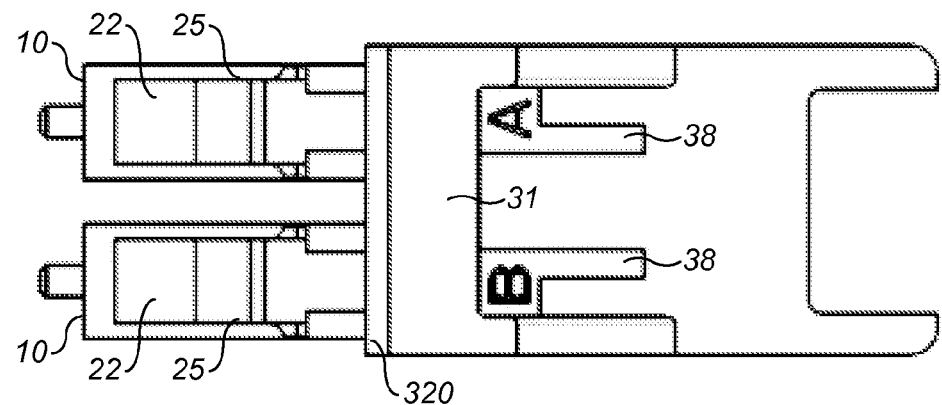
FIG. 14a shows a top view of a fibre optic connector with a third additional security feature according to an embodiment of the invention.
Figure 14B:
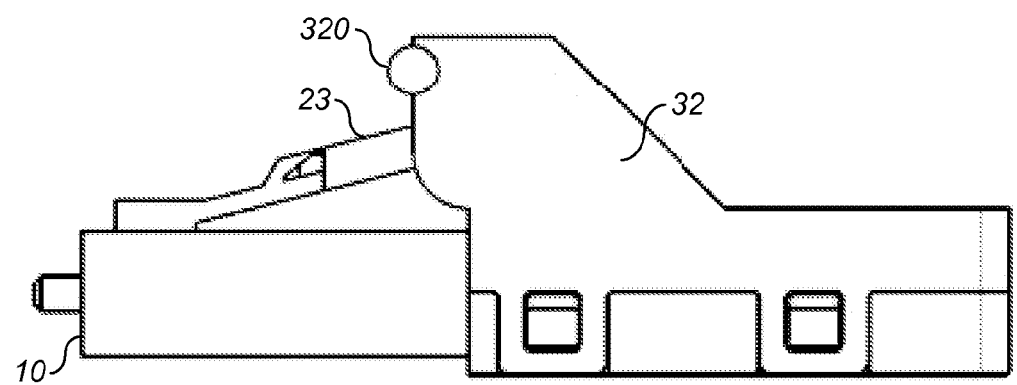

In FIG. 14a, there is shown a top view of a fibre optic connector with a third embodiment of the additional security feature. An insert 320 is provided adjacent the span 31 to prevent access to the ends 23 of the resilient legs in their direction of depression. The insert 320 is advantageously made from rubber. Again, it may extend across the whole width of the connector. FIG. 14b shows a side view of the embodiment of FIG. 14a. No modification is required to an associated keystone in order to accommodate the insert 320.

Figure 15A:
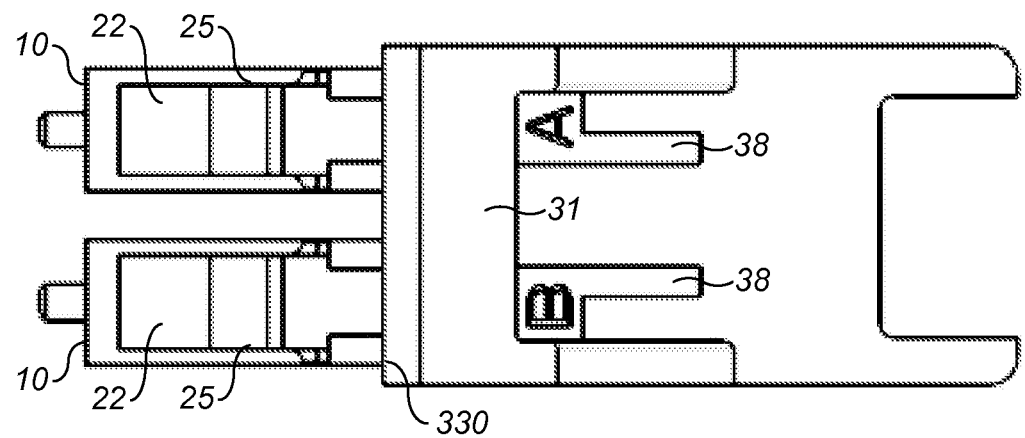
FIG. 15a shows a top view of a fibre optic connector with a fourth additional security feature according to an embodiment of the invention.
Figure 15B:
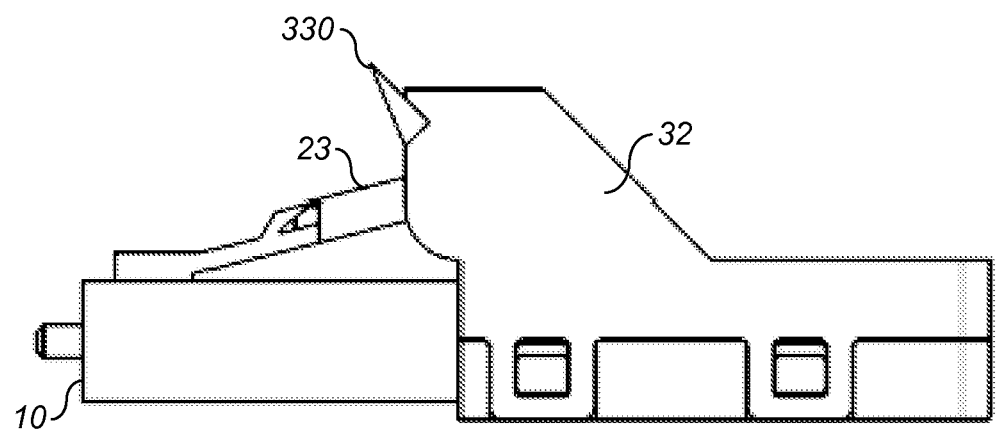

In a fourth alternative embodiment of the additional security feature a lip is provided. FIG. 15a shows a top view of a fibre optic connector with such a fourth embodiment of the additional security feature. Lip 330 is provided adjacent the span 31 to prevent access to the ends 23 of the resilient legs in their direction of depression. Lip 330 may take the form of a flap, which may extend across the whole width of the connector. Advantageously, the lip 330 may be relatively thin. Also, the lip may be integrally moulded with the guard cover. Again, no modification is required to an associated keystone in order to accommodate the lip 330. FIG. 15b shows a side view of the embodiment of FIG. 15a.

Figure 16A:
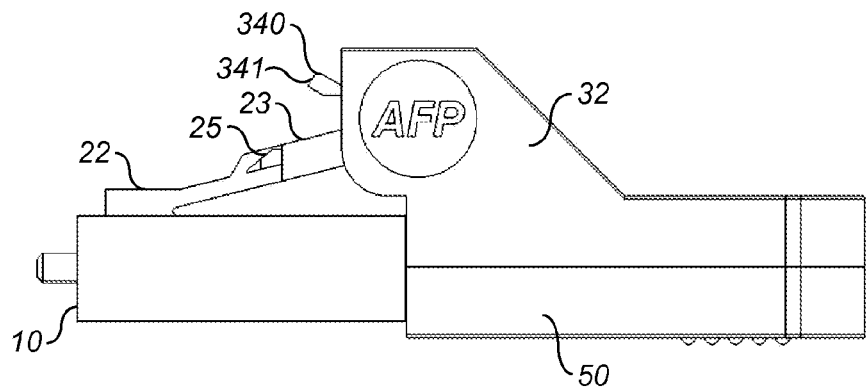
FIG. 16a shows a side view of a fibre optic connector with a fifth additional security feature according to an embodiment of the invention.

In a fifth alternative embodiment of the additional security feature at least one flap is provided. FIG. 16a shows a side view of a fibre optic connector with such a fifth embodiment of the additional security feature. Flap 340 is provided adjacent the span 31 to prevent access to the ends 23 of the resilient legs in their direction of depression.

Figure 16B:
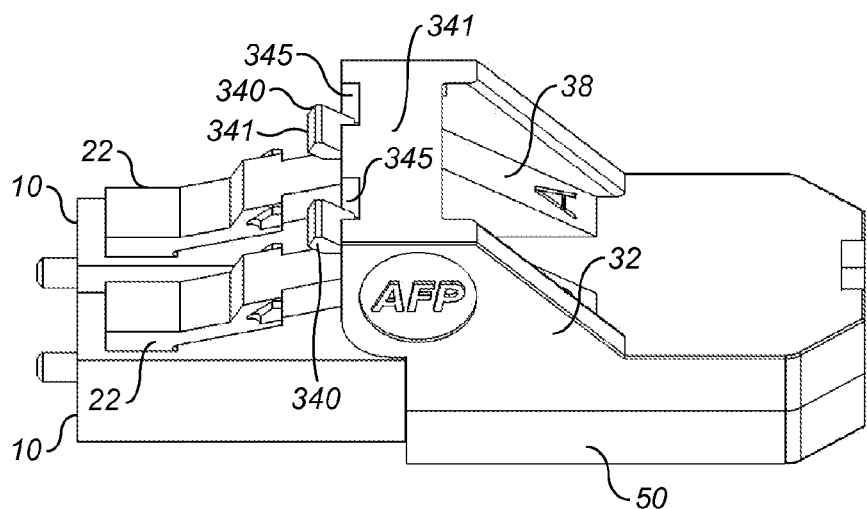

FIG. 16b shows a perspective view of the embodiment of FIG. 16a. It can be seen that two flaps 340 are provided, one for each fibre optic connector plug 10. One end of each flap 340 is pivoted against the bridge span 31. The flaps 340 can therefore move with respect to the bridge span 31.

Also, the bridge span 31 extends closer to the front part of the connector plug 10 in the longitudinal direction than other embodiments. The bridge span 31 is further adapted with associated notches 345. The notches 345 are positioned such that the flaps 340 are pushed into the respective notches 345 when the fibre optic connector is inserted into a socket.

The flaps 340 are shaped such that, when they are pushed into the notches 345, a portion of the flaps 340 extends in the longitudinal direction at least to the location of a front face of the associated socket. In particular, an end 341 of the flaps 340 is angled and shaped such that, when the flaps 340 are pushed into the notches 345, they extend in the longitudinal direction further forward than the bridge span 31. Also, at least a part of each flap 340 is horizontal, that is parallel with the span 31. These features prevent access to the resilient legs at a location close to the front face of the associated socket.

Figure 16C:
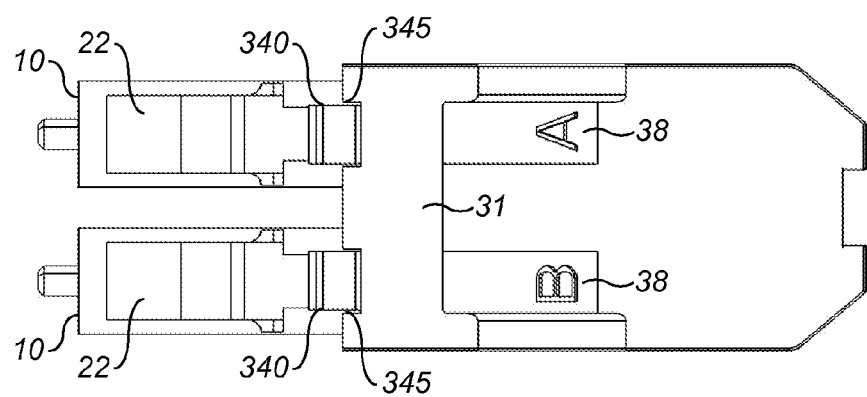

FIG. 16c shows a top view of the embodiment of FIGS. 16a and 16b. Advantageously, the flaps 340 may be integrally moulded with the guard cover. Again, no modification is required to an associated keystone in order to accommodate the flaps 340, since they are pushed into the notches 345 when the connector is inserted into a socket.

Figure 17A:
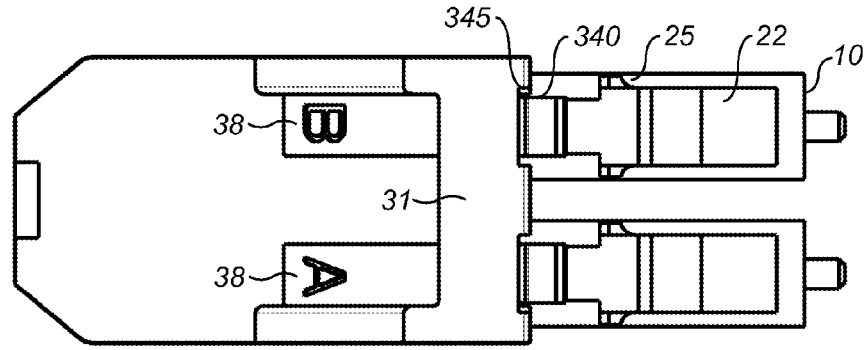
FIG. 17a shows a plan view of a second embodiment of a blanking plug in accordance with the present invention.

FIG. 17a shows a second embodiment of a blanking plug according to the invention in plan view. The blanking plug is similar to that shown in FIG. 11, but additionally incorporates the new features shown in FIGS. 16a to 16c. Specifically, flaps 340 are provided, one for each fibre optic connector plug 10. One end of each flap 340 is pivoted against the bridge span 31.

The bridge span 31 again extends closer to the front part of the connector plug 10 in the longitudinal direction than in the embodiment shown in FIG. 11. The bridge span 31 is further adapted with associated notches 345, positioned to allow the flaps 340 to be pushed into the respective notches 345 when the fibre optic connector is inserted into a socket.

Figure 17B:
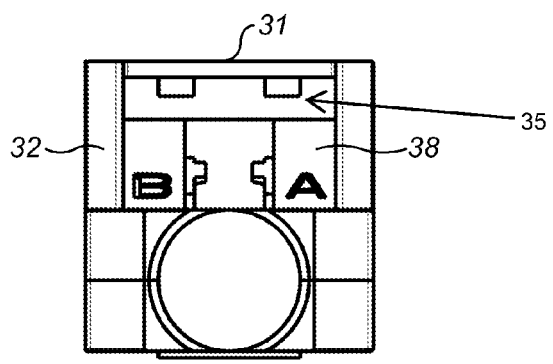
Figure 17C:
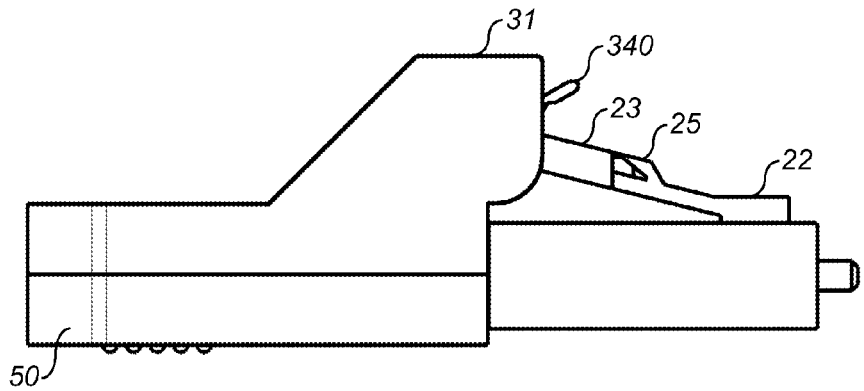
Figure 17D:
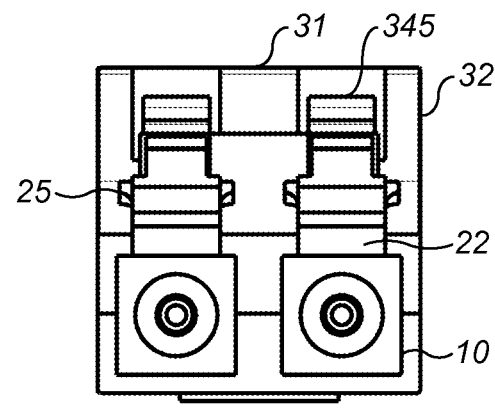
Figure 17E:
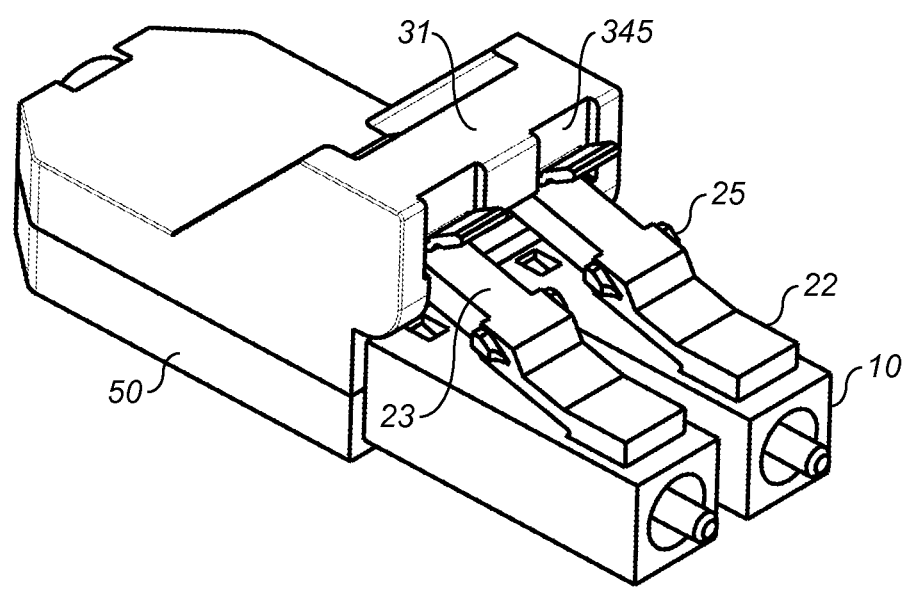

FIG. 17b shows a rear end view of the embodiment of FIG. 17a. FIG. 17c shows a side view of the embodiment of FIG. 17a. FIG. 17d shows a front end view of the embodiment of FIG. 17a. FIG. 17e shows a perspective view of the embodiment of FIG. 17a.

Figure 18:
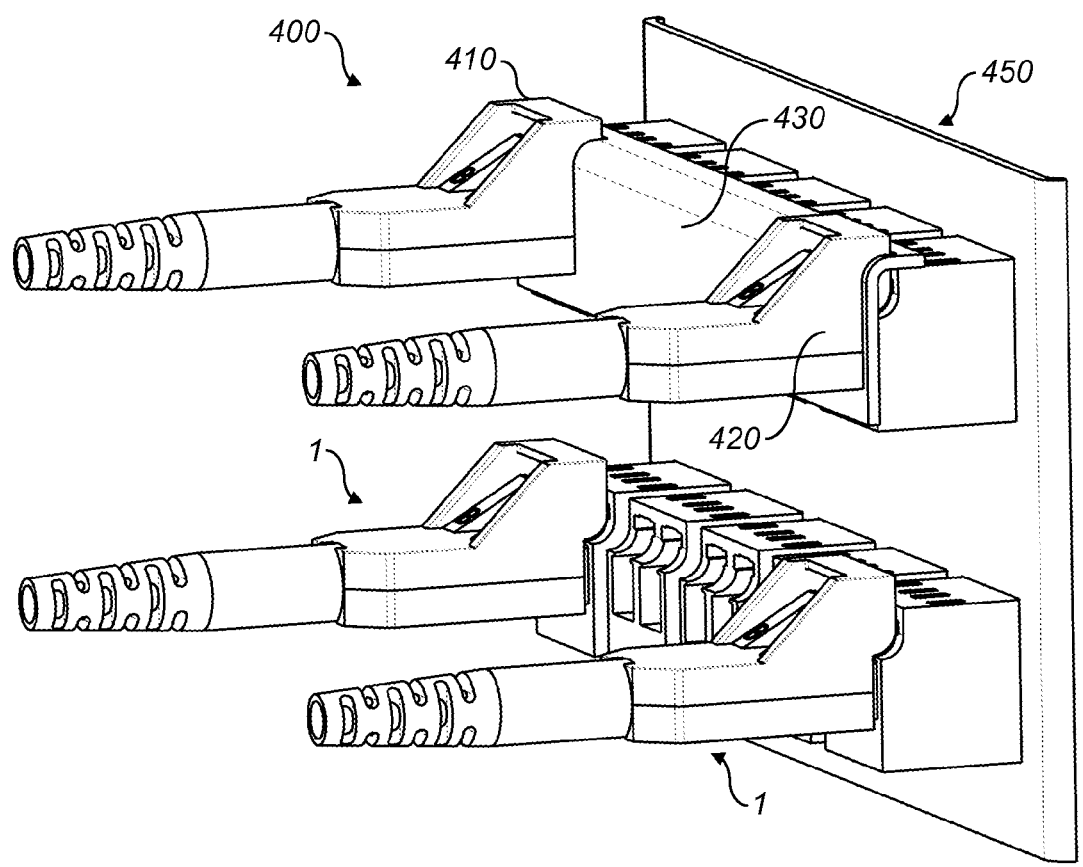
FIG. 18 shows a blanking plate in accordance with the present invention.

FIG. 18 shows a blanking plate according to an embodiment of the present invention. Blanking plate 400 comprises: a first fibre optic connector 410; a second fibre optic connector 420; and a plate 430. The configuration of the blanking plate 400 means that when fibre optic connector 410 and fibre optic connector 420 are inserted into associated sockets, the plate 430 prevents any fibre optic connectors being inserted into the blocked sockets. Also shown in FIG. 18 are associated socket panel 350 and further fibre optic connectors 1. The plate 330 is metal, but may alternatively be plastic or another material.

Where the first fibre optic connector 410 and the second fibre optic connector 420 are provided with a guard cover which inhibits manual release of the fibre optic connectors from the sockets, the blanking plate may only be removed using a corresponding tool or tools to allow release of the first fibre optic connector 410 and the second fibre optic connector 420 from the respective sockets. Advantageously, therefore, this prevents an unauthorised party from removing the blanking plate 400. The first fibre optic connector 410 and the second fibre optic connector 420 may be replaced by corresponding blanking plugs as appropriate.

Means for adjusting the positioning of first fibre optic connector 410 and the second fibre optic connector 420 with respect to the plate are also provided. For example, the first fibre optic connector 410 may be slid on runners to allow its position to be altered. This allows the blanking plate 400 to block different numbers of sockets or to block sockets where the spacing between them is not fixed or standard.

Figure 19A:
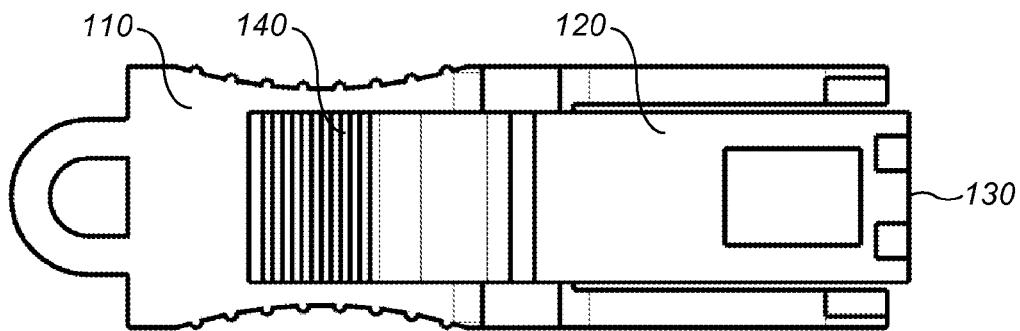
FIG. 19a shows a plan view of a second embodiment of a tool for removing a fibre optic connector in accordance with the present invention.

FIG. 19a shows a plan view of a tool for removing a fibre optic connector from an associated socket according to a second, preferred embodiment of the present invention. The tool is similar to that shown in FIG. 3 and where the same features have been included, identical reference numerals have been used.

Figure 19B:
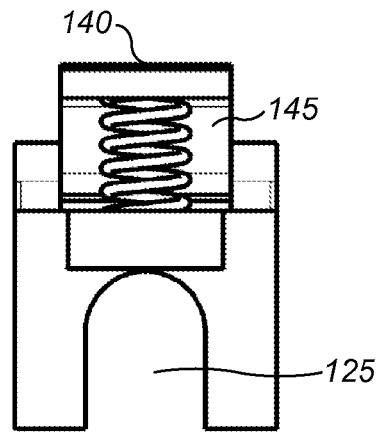
Figure 19C:
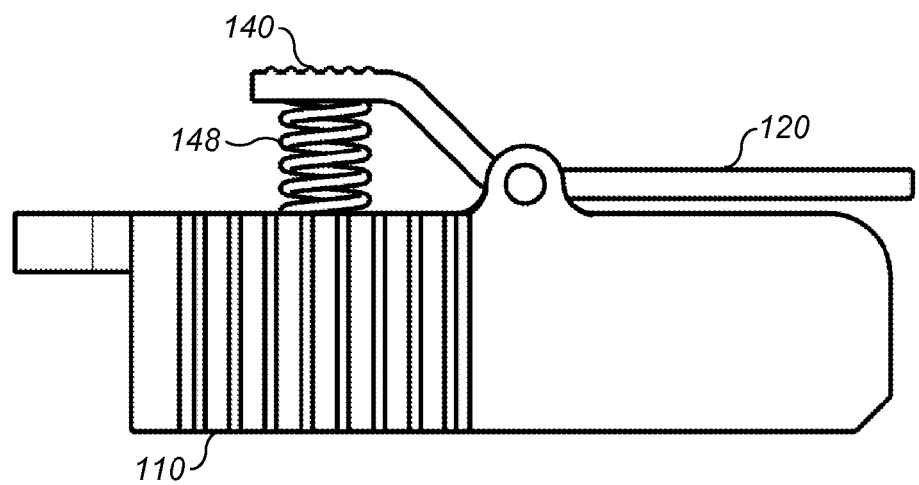
Figure 19D:
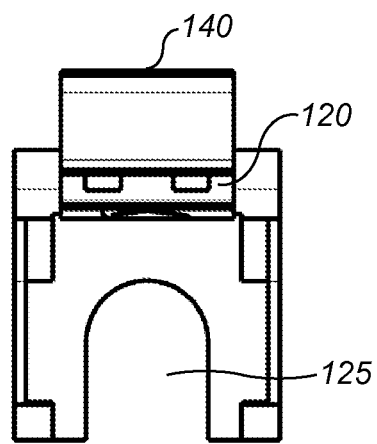
Figure 19E:
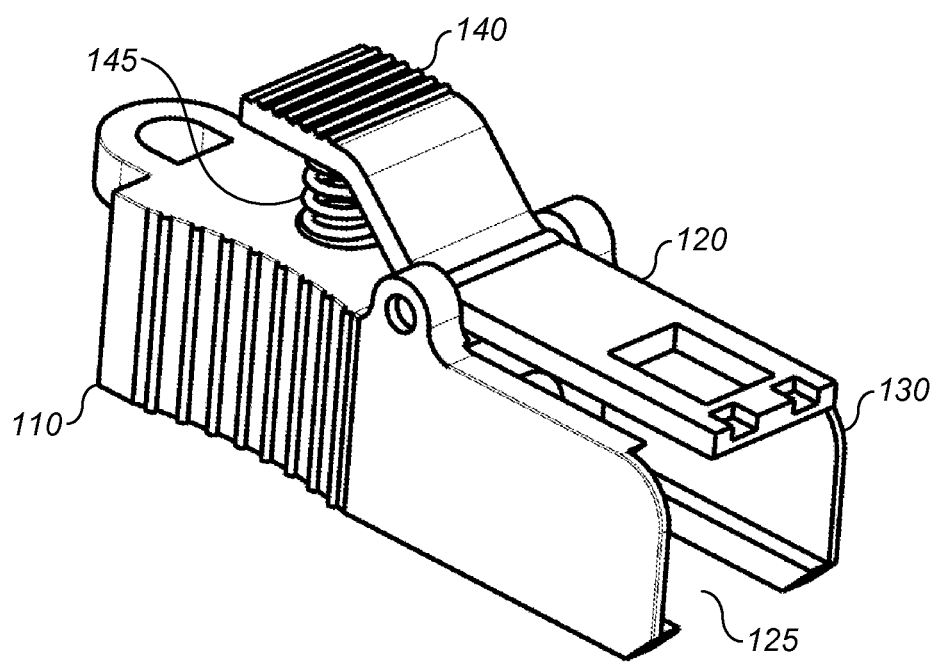

Tool 100 further comprises a raised portion 140 of resilient arm 120. The raised portion 140 is coupled to the tool body 110 using a resilient bias 145 (for example, a spring). FIG. 19b shows a rear end view of the tool of FIG. 19a. FIG. 19c shows a side view of the tool of FIG. 19a. FIG. 19d shows a front end view of the tool of FIG. 19a. FIG. 19e shows a perspective view of the tool of FIG. 19a.

The invention claimed is:

1. A connector comprising:
   a first connector plug, configured to be inserted into an associated socket in a first longitudinal direction;
   a first resilient leg, depending at a first end thereof from the first connector plug, and having a depressible part, distal therefrom, depressible towards the first connector plug;
   a guard cover affixed to the first connector plug, configured to prevent access to the depressible part of the first resilient leg in the direction of depression, but to permit access to the first resilient leg in the first longitudinal direction through a single access aperture, the single access aperture being aligned with the depressible part of the first resilient leg on an axis parallel with the first longitudinal direction, to allow depression of the first resilient leg through the single access aperture by directly contacting the first resilient leg with a tool inserted through the single access aperture;
   a second connector plug, configured to be inserted into an associated socket in the first longitudinal direction;
   a second resilient leg, depending at a second end thereof from the second connector plug, and having a depressible part, distal therefrom, depressible towards the second connector plug; and
   said guard cover affixed to the second connector plug, configured to prevent access to the depressible parts of the first resilient leg and the second resilient leg in their directions of depression, but to permit access to the first resilient leg and the second resilient leg in the first longitudinal direction through the single access aperture, the single access aperture being aligned with the depressible part of the second resilient leg on an axis parallel with the first longitudinal direction to allow depression of the first resilient leg and second resilient leg through the single access aperture by directly contacting the first and second resilient legs with a tool inserted through the single access aperture.

2. The connector of claim 1, further comprising a tool, the tool comprising:
   a tool body;
   a resilient arm depending from the tool body; and
   a tongue formed upon a distal end of the resilient arm and adapted to pass through the single access aperture of the connector and depress at least one of the first resilient leg and the second resilient leg of the connector by directly contacting at least one of the first resilient leg and the second resilient led with the resilient arm.

3. The connector of claim 1, wherein the guard cover includes a bridge over the first resilient leg and the second resilient leg, the bridge having bridge supports surrounding the first resilient leg and the second resilient leg, and a bridge span joining the supports and spaced from the first resilient leg and the second resilient leg.

4. The connector of claim 3, wherein a region bounded by the bridge span, the bridge supports, and the first connector plug and the second connector plug defines the single access aperture.

5. The connector of claim 4, wherein at least one of the bridge span, the bridge supports, the first connector plug, and the second connector plug includes at least one protrusion which functions as a key to prevent a non-matching tool from entering the single access aperture and depressing at least one of the first resilient leg and the second resilient leg.

6. The connector of claim 1, further comprising a tool, the tool comprising:
   a tool body;
   a resilient arm depending from the tool body; and
   a tongue formed upon a distal end of the resilient arm and adapted to pass through the single access aperture of the connector and depress at least one of the first resilient leg and the second resilient leg of the connector by directly contacting at least one of the first resilient leg and the second resilient led with the tongue.

7. The connector of claim 5, further comprising:
   a tool sized for entering the single access aperture, wherein the tool includes a key-like formation that aligns with the at least one protrusion on one of the bridge span, the bridge supports, the first connector plug, and the second connector plug to allow the tool to enter the single access aperture and depress at least one of the first resilient leg and the second resilient leg.

8. The connector of claim 1, wherein the first connector plug and the second connector plug are LC connector plugs.

9. The connector of claim 1, further comprising:
   a lip pivotally mounted to the bridge and extending upward away from the first connector plug and the second connector plug to prevent access to at least one of the first resilient leg and the second resilient leg in direction of depression of the first resilient leg and the second resilient leg.

10. The connector of claim 9, wherein the bridge includes a notch sized for receiving the lip, such that a force pushing the lip towards the bridge causes the lip to be pushed into the notch of the bridge.

11. The connector of claim 1, further comprising:
a flap pivotally mounted to the bridge and extending upward away from the first connector plug and the second connector plug to prevent access to at least one of the first resilient leg and the second resilient leg in direction of depression of the first resilient leg and the second resilient leg.

12. The connector of claim 11, wherein the bridge includes a notch sized for receiving the flap, such that a force pushing the flap towards the bridge causes the flap to be pushed into the notch of the bridge.

13. The connector of claim 10, wherein the force pushing the lip into the notch occurs while inserting the connector into a socket.

14. The connector of claim 12, wherein the force pushing the flap into the notice occurs while inserting the connector into a socket.

15. The connector of claim 4, wherein at least one of the bridge span, the bridge supports, the first connector plug, and the second connector plug includes at least one notch which functions as a key to prevent a non-matching tool from entering the single access aperture and depressing at least one of the first resilient leg and the second resilient leg.

* * * * *